US012165398B2

(12) United States Patent
Zhao et al.

(10) Patent No.: US 12,165,398 B2
(45) Date of Patent: Dec. 10, 2024

(54) METHOD AND APPARATUS FOR TRAINING AN OBJECT RECOGNITION MODEL

(71) Applicant: CANON KABUSHIKI KAISHA, Tokyo (JP)

(72) Inventors: Dongyue Zhao, Beijing (CN); Dongchao Wen, Beijing (CN); Xian Li, Beijing (CN); Weihong Deng, Beijing (CN); Jiani Hu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 17/543,574

(22) Filed: Dec. 6, 2021

(65) Prior Publication Data
US 2022/0180627 A1 Jun. 9, 2022

(30) Foreign Application Priority Data
Dec. 9, 2020 (CN) .......................... 202011427289.7

(51) Int. Cl.
*G06V 10/00* (2022.01)
*G06V 10/74* (2022.01)
*G06V 10/774* (2022.01)
*G06V 10/82* (2022.01)

(52) U.S. Cl.
CPC ............ *G06V 10/82* (2022.01); *G06V 10/761* (2022.01); *G06V 10/7747* (2022.01)

(58) Field of Classification Search
CPC .. G06V 10/82; G06V 10/761; G06V 10/7747; G06V 10/30; G06V 10/454; G06V 10/772; G06V 40/172; G06F 18/2148; G06F 18/22; G06F 18/2415; G06N 3/045; G06N 3/084
See application file for complete search history.

(56) References Cited

U.S. PATENT DOCUMENTS

| | | | |
|---|---|---|---|
| 7,899,652 B2* | 3/2011 | Lu ........................... | G06F 30/20 |
| | | | 703/2 |
| 10,552,977 B1* | 2/2020 | Theis ........................ | G06T 7/70 |
| 11,599,792 B2* | 3/2023 | Li ............................ | G06N 3/047 |
| 2021/0110274 A1* | 4/2011 | Tripathi .................. | G06N 5/046 |
| 2019/0392248 A1* | 12/2019 | Zhang ................... | G06V 10/761 |
| 2021/0042580 A1* | 2/2021 | Chen .................. | G06V 10/7753 |
| 2022/0138454 A1* | 5/2022 | Zhao ..................... | G06F 18/214 |
| | | | 382/156 |
| 2022/0180627 A1* | 6/2022 | Zhao .................... | G06F 18/2148 |
| 2023/0044078 A1* | 2/2023 | Kumar ..................... | G06N 3/08 |

* cited by examiner

*Primary Examiner* — Md K Talukder
(74) *Attorney, Agent, or Firm* — Canon U.S.A., Inc. IP Division

(57) ABSTRACT

The present disclosure relates to training method and apparatus for an object recognition model. There provides a training sample optimization apparatus for a neural network model for object recognition, comprising: for each training sample in a training sample database, a fluctuation determination unit configured to determine a fluctuation of model prediction of the training sample relative to a corresponding labeled identity of the training sample in a case of training the neural network model; and an optimization unit configured to determine whether the training sample can be used for training of the neural network model in the next training epoch, based on the fluctuation of the training sample.

20 Claims, 15 Drawing Sheets

Algorithm: model training using dynamic sample optimization

Input: training database $X$ (training image $X_i \in X$)
  data dropout ratio $p_d$, training epoch $K=1$
  maximum amount of training epochs $Kmax$
Output: model parameters $\Theta$
Start the training in a case that no data is dropped (i.e., $K=1$),
  train a model ($W$, $\Theta$) by training all samples in the training database $X$, record $\theta_{min}$, $\theta_{yi}$ for each sample.
  calculate fluctuation score of each sample in the training epoch 1:

$$F(X_i) = d(X_i) = cos\theta_{min} - cos\theta_{y_i}$$

As the training epochs proceed, when $K < Kmax$
  $K = K + 1$;
  calculate a threshold $F_{thd}$ according to the data dropout ratio $p_d$;
  compare the fluctuation score of each sample with the threshold $F_{thd}$ to generate dropout mask for the sample;
  select samples suitable for model training from the training database based on the dropout mask;
  train the model ($W$, $\Theta$) according to the selected samples $X^s$, record $\theta_{min}$, $\theta_{yi}$,
  for a selected sample $X_i \in X^s$
    calculate a difference $$d^K(X_i) = cos\theta_{min}^K - cos\theta_{y_i}^K, \quad X_i \in X^s;$$

for a non-selected sample $X_j \in X \setminus X^s$
    calculate a difference $$d^K(X_j) = \overline{d^K(X_i)}, \quad X_i \in X^s;$$

Accumulatively update the fluctuation score of each sample as follows:

$$F(X_i) = \frac{1}{K}\sum_{k=1}^{K} d^k(X_i)$$

Fig. 6B

METHOD AND APPARATUS FOR TRAINING AN OBJECT RECOGNITION MODEL

CROSS-REFERENCE TO RELATED APPLICATIONS

The present application claims the benefit of Chinese Patent Application No. 202011427289.7, filed Dec. 9, 2020, which is hereby incorporated by reference herein in its entirety.

FIELD OF THE DISCLOSURE

The present disclosure relates to object recognition, and more particularly to training and application of a neural network model for object recognition.

BACKGROUND

In recent years, object detection/recognition/comparison/tracking with respect to a still image or a series of moving images (such as a video) has been widely and importantly applied to the fields of image processing, computer vision and pattern recognition and played an important role therein. An object may be a body part of a person, such as a face, a hand, a body, etc., other living beings or plants, or any other object that is desired to be detected. Face/object recognition is one of most important computer vision tasks, and its goal is to recognize or verify a specific person/object based on an input picture/video.

In recent years, a neural network model for face recognition, especially a deep convolutional neural network (CNN) model, has reached breakthrough progress in significantly improving performance and improving the technical level of face/object recognition. Given a training data set, the CNN training process uses a general CNN architecture as a feature extractor to extract features from training images, and then calculates the loss data for supervised training of the CNN model by using various designed loss functions. At present, a Softmax loss function and its variant (a boundary-based Softmax loss function) are commonly used as supervision functions in face/object recognition. In addition to continuously evolved Deep Convolutional Neural Network architecture and effective Softmax-based loss function, a large-scale training database plays a vital role in face/object deep recognition.

However, it should be pointed out that the current large-scale training database is often not ideal and often contains a certain proportion of noisy samples therein, which will obviously influence the training and recognition performance of the model, resulting in the result object recognition model being inaccurate and unable to obtain an ideal recognition effect. However, it is very expensive and time-consuming to obtain a well-labeled large-scale training database, which leads to low processing efficiency.

Therefore, it needs an improved technique to improve the training of object recognition model, especially to optimize training samples for training the object recognition model, and particularly to optimize the training samples in the process of training by means of a training database containing a certain proportion of noisy samples to improve the model training.

Unless otherwise stated, it should not be assumed that any of the methods described in this section are prior art juts because they are included in this section. Also, unless otherwise stated, it should not be assumed that issues recognized with respect to one or more methods have been recognized in any prior art on the basis of this section.

SUMMARY

The present disclosure is to improve the training of a recognition model for object recognition. Another object of the present disclosure is to improve object recognition for image/video.

The present disclosure proposes improved training of a convolutional neural network model for object recognition, wherein the training samples for training a neural network model are optimized during training, so that as the training process progresses, the employed training samples can be adjusted adaptively, particularly it can effectively avoid using inappropriate training samples for training in the process of training, thus obtaining a high-performance training model even for a training data set containing noise.

The present disclosure also proposes using the model obtained through the above training process to perform object recognition, thereby further obtaining an improved object recognition result.

In one aspect, there provides a training sample optimization apparatus for a neural network model for object recognition, comprising: for each training sample in a training sample database, a fluctuation determination unit configured to determine a fluctuation of model prediction of the training sample relative to a corresponding labeled identity of the training sample in a case of training the neural network model; and an optimization unit configured to determine whether the training sample can be used for training of the neural network model in the next training epoch, based on the fluctuation of the training sample.

In another aspect, there provides a training apparatus for a neural network model for object recognition, comprising: a training sample optimization unit configured to, for a given training sample database, optimize a training sample database for neural network model training by using the training sample optimization apparatus according to the embodiments of the present disclosure; and a training unit configured to train the neural network model by utilizing the optimized training sample database.

In yet another aspect, there provides a training sample optimization method for a neural network model for object recognition, comprising: for each training sample in a training sample database, a fluctuation determination step adapted to determine a fluctuation of model prediction of the training sample relative to a corresponding labeled identity of the training sample in a case of training the neural network model; and an optimization step adapted to determine whether the training sample can be used for training of the neural network model in the next training epoch, based on the fluctuation of the training sample.

In still another aspect, there provides a training method for a neural network model for object recognition, comprising: a training sample optimization step adapted to, for a given training sample database, optimize a training sample database for neural network model training by using the training sample optimization apparatus according to the embodiments of the present disclosure; and a training step adapted to train the neural network model by utilizing the optimized training sample database.

In yet another aspect, there provides a device comprising at least one processor; and at least one storage device on which instructions are stored, the instructions, when executed by the at least one processor, causing the at least one processor to perform the method as described herein.

In yet another aspect, there provides a storage medium storing instructions that, when executed by a processor, cause execution of the method as described herein.

Other features of the present disclosure will become apparent from the following description of exemplary embodiments with reference to the accompanying drawings.

DESCRIPTION OF THE DRAWINGS

A better understanding of the present disclosure may be obtained when considering following detailed description of embodiments in conjunction with the accompanying drawings. The same or similar reference numerals are used in the drawings to indicate the same or similar components.

FIG. 6B shows an exemplary algorithm flow chart of model training using dynamic sample optimization according to one or more aspects of the present disclosure.

DETAILED DESCRIPTION

Figure 1:
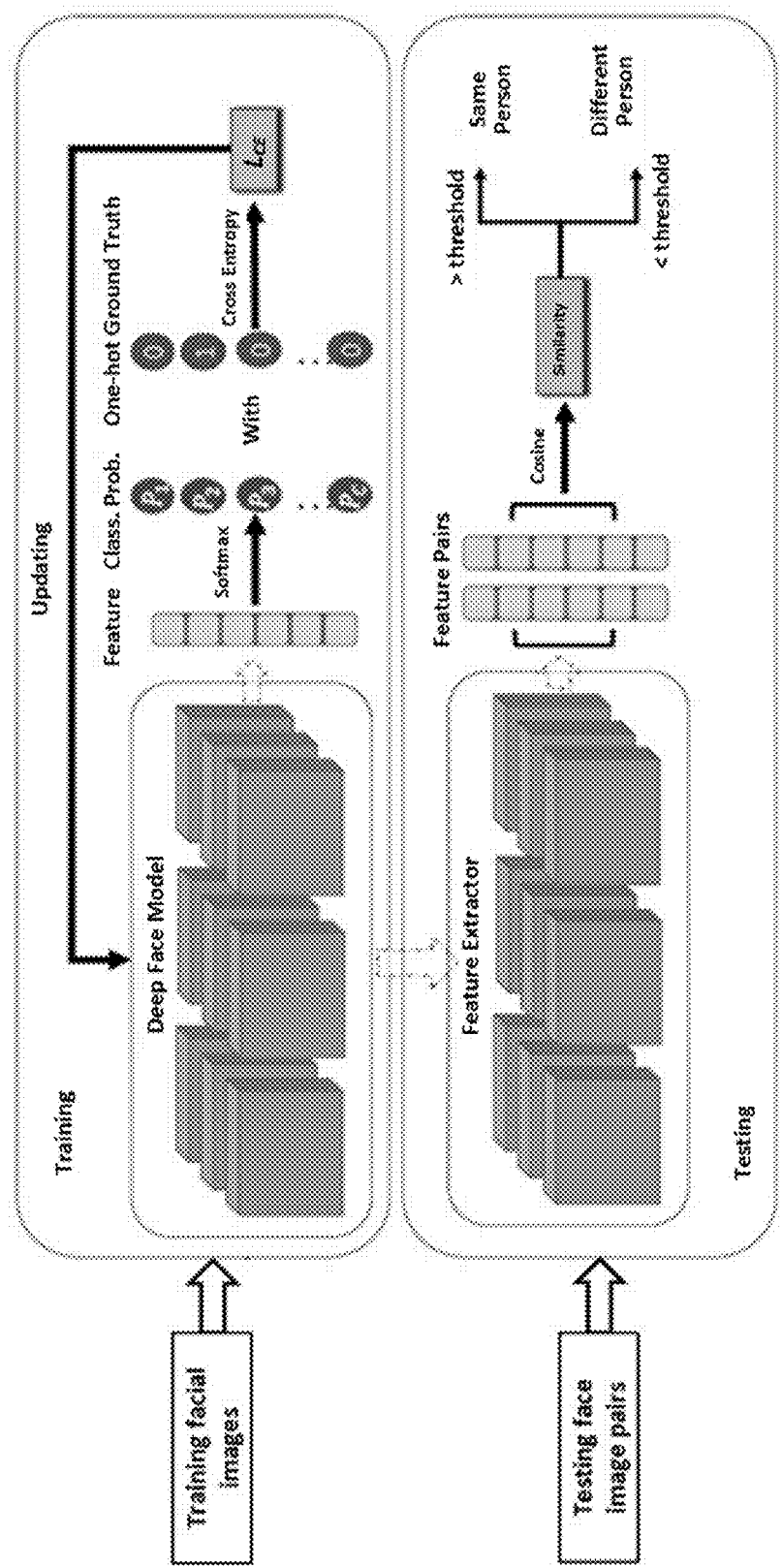
FIG. 1 shows a schematic diagram of face recognition/authentication using a neural network model in the prior art.

Described herein are exemplary possible embodiments related to training optimization of a model for object recognition. In the following description, for the purpose of explanation, numerous specific details are set forth in order to provide a thorough understanding of the present disclosure. However, it is apparent that the present disclosure can be practiced without these specific details. In other instances, well-known structures and devices are not described in detail to avoid unnecessarily blocking, covering, or obscuring the present disclosure.

In the context of the present disclosure, training of an object recognition model is performed based on a training data/sample set/database, which contains a large number of data/samples for training of an object recognition model, and a typical example of a training data/sample is a training image.

In the context of the present disclosure, an image may refer to any one of a variety of images, such as a color image, a grayscale image, and the like. It should be noted that, in the context of this specification, the type of image is not specifically limited as long as such an image can be subjected to processing so as to execute subsequent processes, for example, it can be employed in model training or can be employed in detecting/recognizing whether an image contains an object. In addition, the image may be an original image or a processed version of the image, such as a version of an image that has undergone pre-filtering or pre-processing before operations of the present application are to be performed on the image.

In the context of this specification, an image containing an object means that the image contains an object image of the object. The object image may also be referred to as an object area in the image. Object recognition also refers to recognizing an image of an object area in an image.

In this context, an object may be a body part of a person, such as face, hands, body, etc., other living beings or plants, or any other object that is intended to be detected. As an example, features of an object, especially its representative features, can be represented in a vector form, which can be referred to as a "feature vector" of the object. For example, in a case of detecting a face, pixel texture information, position coordinates, and the like of a representative part of a human face are selected as features to constitute a feature vector of the image. Therefore, object recognition/detection/tracking can be performed based on the obtained feature vector. It should be noted that the feature vector may vary depending on a model used in object recognition, and is not particularly limited.

Hereinafter, embodiments of the present disclosure will be described in detail with reference to the drawings. It should be noted that similar reference numbers and characters in the figures indicate similar items, and therefore once an item is defined in one figure, it need not be discussed for subsequent figures.

In the present disclosure, the terms "first", "second", and the like are only used to distinguish elements or steps, instead of being intended to indicate chronological order, preference, or importance.

FIG. 1 shows basic conceptual operations of face recognition/authentication using a deep face model in the prior art, which mainly include a training stage and an application stage of the deep face model, and the deep face model may be, for example, a deep convolutional neural network model.

In the training stage, a face image training set is first input to a deep face model to obtain feature vectors of face images, and then, an existing loss function, such as a Softmax loss function and its variants, can be used to obtain classified probabilities $P_1, P_2, P_3, \ldots, P_c$ (where c indicates the number of classes in the training set, such as face IDs corresponding to c classes) from the feature vectors, the classification probabilities indicating a probability that the image belongs to each of the c classes, and the obtained classified probabilities are compared with real situation values 0, 1, 0, . . . , 0 (where 1 indicates the true value) to determine the difference therebetween, such as cross entropy, as the loss data, and a feedback is performed based on the difference so as to update the deep face model, and then the foregoing operations resume by using the updated face model, until a specific condition is satisfied, thereby obtaining a trained deep face model.

In a test stage, a face image to be identified or a face image to be authenticated may be input into a trained deep face model to extract features for identification or authentication. Specifically, in an actual application system, there can be two specific applications: face/object recognition and face/object verification. The input to face/object recognition is generally a single face/object image, and the trained convolutional neural network is used to identify whether the face/object in the current image is the recognized object; the input to face/object verification is generally a pair of person face/object images, the trained convolutional neural network is utilized to extract feature pairs of the input pair of images, and finally, whether the input pair of images correspond to the same object is determined based on similarity of the feature pairs.

An exemplary face authentication operation is shown in FIG. 1. In operation, two face images to be authenticated are input into a trained deep face model to authenticate whether the two face images are face images of the same person. Specifically, the deep face model may obtain feature vectors for the two face images individually to form a feature vector pair, and then determine similarity between the two feature vectors, for example, the similarity may be determined by a cosine function. When the similarity is not less than a specific threshold, the two face images may be considered to be face images of the same person, and when the similarity is less than the specific threshold, the two face images may be considered not to be face images of the same person.

Figure 2A:
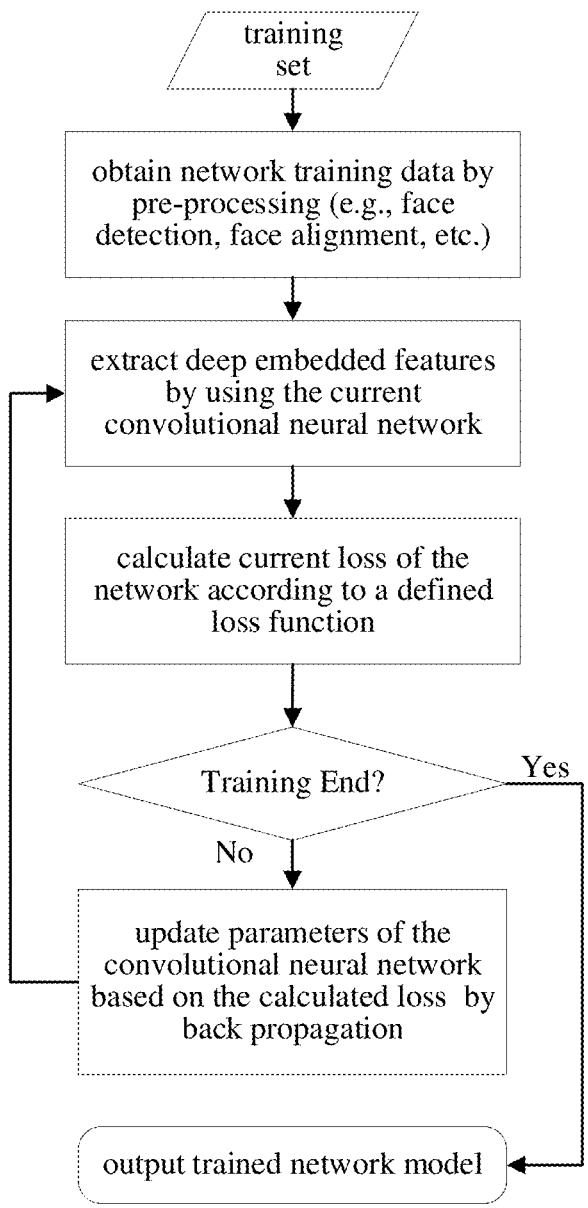
FIGS. 2A and 2B show flowcharts of training a neural network model in the prior art.

As can be seen from the above description, the performance of the deep face model directly affects the accuracy of object recognition, and in the prior art, various methods have been utilized to train the deep face model, such as a deep convolutional neural network model, to obtain a more complete depth convolutional neural network model. A conventional training process for a deep convolutional neural network model in the prior art will be described below with reference to FIG. 2A.

First, a training data set is input, and the training data set may include a large number of object images, such as face images, for example, tens of thousands, hundreds of thousands, millions of object images.

Then, the images in the input training data set may be pre-processed, and the pre-processing operations may include, for example, object detection, object alignment, normalization, and the like. In particular, the object detection may refer to, for example, detecting a human face from an image containing the human face and obtaining an image mainly containing the human face to be identified, and the object alignment may refer to aligning object images in different poses included in the images to the same or appropriate posture, thereby object detection/recognition/tracking can be performed based on the aligned object images. Face recognition is a common object recognition operation, and for the face recognition training image set, a variety of preprocessing including, for example, face detection, face alignment, and the like can be performed. It should be noted that the pre-processing operation may also include any other type of pre-processing operations known in the art, which will not be described in detail here.

Then, the pre-processed training image set is input to a deep convolutional neural network model for feature extraction. The convolutional neural network model can adopt various structures and parameters known in the art, etc., which will not be described in detail here.

Then, a loss is calculated by means of a loss function. The common loss function is especially the above-mentioned Softmax loss function and its variants (for example, boundary-based Softmax loss function), which are commonly used supervised information in the face/object recognition. These loss functions encourage separation between features, whose goal is to ideally minimize the intra-class distance while maximizing the inter-class distance. A general form of the Softmax loss function is as follows:

$$L = -\frac{1}{N}\sum_{i=1}^{N} \log P_{y_i} = -\frac{1}{N}\sum_{i=1}^{N} \log \frac{e^{W_{y_i}^T x_i + b_{y_i}}}{\sum_{j=1}^{C} e^{W_j^T x_i + b_j}} \quad (1)$$

Where N indicates the mini-batch size, $x_i \in \mathbb{R}^d$ is the recognition feature of the ith training image, such as embedding feature, $y_i$ is the class label for $x_i$, $P_{y_i}$ indicates the predicted probability of assigning the feature $x_i$ to the class $y_i$, C is the number of classes in the training data set, $W=\{W_1, W_2, \ldots, W_C\} \in \mathbb{R}^{d \times C}$ represents the weight for the last fully connected layer in the DCNN, and $W_j \in \mathbb{R}^d$ is a weight vector for the jth column of the last fully connected layer in the DCNN, $b_j \in \mathbb{R}^C$ is a bias term.

Then, the parameters of the convolutional neural network are updated based on the calculated loss data by back propagation.

The above operation will be performed iteratively, until the specific condition is satisfied and the training ends.

In recent years, softmax-based loss functions, such as NSoftmax, CosFace, ArcFace, etc., have been developed. Although these functions have obtained great success in face/object depth recognition, they are designed for training clean data sets, but cannot obtain ideal results for the existing training data sets for face/object recognition, which often contain noisy images, so that the recognition performance of the depth face/object training model would be significantly reduced.

The training data set often contains many different types of noisy samples, such as label noise images and low-quality images. The label noise image may refer to an image of a non-label object, for example, the object in the image is not an object contained in a data set label, or is an object contained in a data set label but not a training label. Due to indicating incorrect object, the label noise image will seriously affect the training and recognition performance of the model. The low-quality image can refer to an image that cannot provide enough effective features. Because of its quality is too low, the low-quality image cannot allow to extract valid information therefrom to recognize the identity, which also affects the recognition performance of the trained model. For example, low-quality images may include misaligned images, blurred images, extreme pose images, and the like.

These noisy images cannot provide correct labeled identity information, which will degrade the recognition performance of the trained deep face/object training model. In particular, the prior art techniques all assume that given an ideal training data set, the intra-class distance is strictly minimized and the inter-class distance is strictly maximized, so that in the training process, the noisy samples tend to project in the feature space areas of other objects mistakenly and cannot be effectively separated from the clean samples, thus making the trained model over-fit due to the interference of the noisy samples.

Although the current large-scale training database can be optimized by a manually-annotated semi-automatic data cleansing algorithm, noisy samples still cannot be avoided. The main reason is that manual annotation and deep face/object recognition model have different recognition mechanisms, so the manual annotation may not be as reliable as we thought. Therefore, even the face/object recognition model trained on the cleansed large-scale training database still cannot achieve the ideal recognition performance.

Figure 2B:
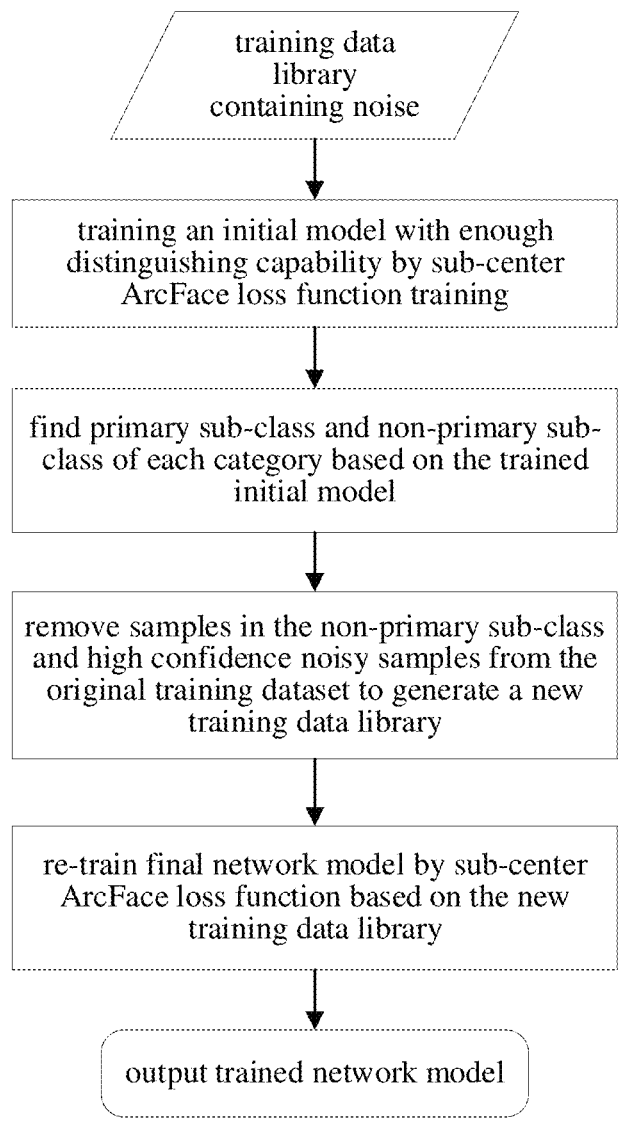

Jiankang Deng, et al, sub-center ArcFace: Boosting Face recognition by Large-scale Noisy Web Faces proposes a multi-subcenter ArcFace loss function called "Sub-center Arcface" method, which aims to improve the stability of the trained model on the training database containing noises. In this method, K sub-centers are designed for each class at first, and a training sample only needs to be close to any one of K sub-centers instead of only one center. It encourages a primary subclass to contain most clean samples and non-primary subclasses to contain difficult samples or noisy samples. After the model reaches enough recognition ability, most clean samples will be concentrated in one primary subclass center, while other difficult samples and noisy samples will be close to other subclass centers. Then, the non-primary sub-class center and high-confidence noisy samples are removed from the original training database, thus generating a new training database. Finally, a deep face/object training model is obtained by using the new training database, which reduces the influence of noisy samples on the model. FIG. 2B shows the process of model training using the subcenter ArcFace method in the prior Art.

However, in this Sub-center ArcFace method, it also needs perform the training twice to get the final face/object recognition model; and the noisy samples are cleaned only once with a fixed angle threshold, while the new training data set may not be an ideal training data set.

Therefore, it is necessary to further optimize the training sample set for model training, so as to effectively restrain the influence of noisy samples in the training sample set on model training.

Through research, the inventor realized that in the training process, the gradient of a noise image will facilitate it to be predicted as a labeled identity by the face model; however, training and generalization for other face images will prevent these images from falling into feature spaces identified by labels. That is to say, in the training process, noise always imposes an opposite influence on clean samples. Two opposite effects caused by noisy samples in the training set will lead to fluctuations in the training process, which provides clues for distinguishing clean samples from noisy samples.

Figure 3:
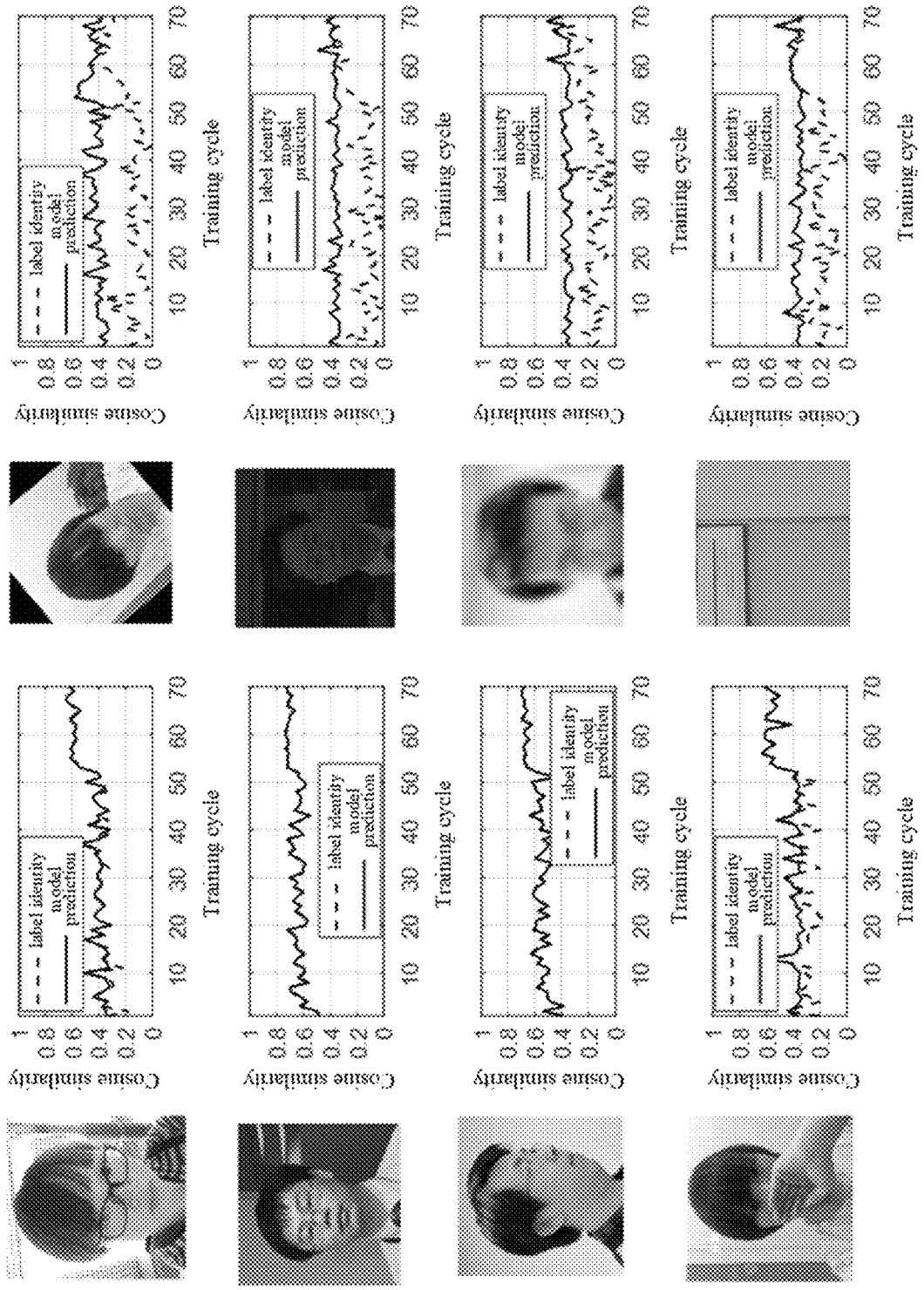
FIG. 3 shows the similarity differences between the model predictions of clean samples and noisy samples and their labeled identities in a training epoch.

FIG. 3 shows the relationship between curves of simulation prediction and labeled identity of training samples in different training epochs discovered by the inventors. As an example, the relationship is indicated by the cosine similarity comparison between model prediction and labeled identity, wherein (a) indicates the cosine similarity comparison between curves of model prediction and labeled identity of clean samples, and (b) indicates the cosine similarity comparison between curves of model prediction and labeled identity of noisy samples. It can be seen that with the increase of training epoch, the similarity differences of clean samples tend to be stable with little fluctuation, and their curves of model prediction almost coincide with that of the labeled identity. However, the similarity differences of noisy samples are often unstable and have large fluctuation, and their curves of model prediction often do not coincide with that of the labeled identity. Especially, even for the selected "difficult samples" (such as large posture and occlusion), the similarity differences between corresponding clean samples and noisy samples are still significant.

In view of this, the present disclosure proposes an improved training data optimization method, which can optimize the training data by utilizing the fluctuation of training samples in the training database and carry out model training based on the optimized training data, thereby realizing improved model training and improving model recognition ability.

According to one aspect of the present disclosure, in the training process, clean samples and noisy samples are detected/distinguished by using the fluctuation of training samples in the training database, and according to the detection/distinguishing result, noise data is dropped and clean data is utilized to carry out the model training. It should be pointed out that clean samples and noisy samples are only exemplary. A clean sample essentially indicates a sample whose model training fluctuation is small and which is suitable for model training, while a noisy sample essentially refers to a sample whose model training fluctuation is too large to be suitable for model training. In this way, the fluctuation can be utilized to select samples for model training more appropriately, which can improve model training and improve model recognition ability.

The training data optimization method according to the present disclosure can be performed in various suitable ways. According to one embodiment, the training data optimization method can be implemented in a so-called "static" manner, in which the training data can be optimized for each training session/round in the training process, and the adopted training data is fixed for all training epochs included in one training session/round. According to another embodiment, the training data optimization method can be implemented in a so-called "dynamic" manner, in which the training data can be optimized for each training epoch included in one training session/round, so that the training data used in each training session/round vary dynamically.

As an example, the training data optimization method can adopt a staged training strategy in the training process, such as two-round or more-round training strategy. As an example, in the two-round training strategy, the first round of training is to use all the images of the training database to train the model for detecting noise; then calculate fluctuation scores of all images, and detect noise images according to the calculated fluctuation scores; then the noise images are removed from the original training database to get a new training database; after that, in the second round of training, the new training database is used to train and get the final network model. The more-round training strategy can also be performed in a similar manner. It should be pointed out that the database remains unchanged in each training round, and the database used for model training in each training round can be derived based on an initial training database, or can be derived based on the training database employed in the previous training round. It should be noted that a specific number of training epochs may be included in each training round, where the specific number may be the number of training epochs set in advance or the number of training epochs until the training end condition is satisfied.

As another example, more preferably, the training data optimization method may adopt a dynamic training data optimization method. During the training process, the fluctuation values of training samples are updated continually according to the model prediction, and inappropriate training data are dropped dynamically in each training epoch. In particular, in each training epoch of the training process, the fluctuation values of training samples are determined according to the model prediction, and samples appropriate for model training in the next training epoch are selected from the training database according to the fluctuation values, so that the training samples can be dynamically updated and optimized, instead of being directly eliminated, thus training a more accurate model.

According to another aspect of the present disclosure, in the training process, the volatilities of training samples in the training database are used to mark/determine the confidences of the training samples, and the model training is effectively guided based on the confidences, especially the model loss function is weighted according to the confidences, so that the model training convergence can be effectively improved so as to improve the model training.

According to still another aspect of the present disclosure, it is more preferable to detect/distinguish clean samples from noisy samples by using the volatilities of training samples in the training database in the training process, thereby dropping noise data according to the detection/distinguishing result and using clean data for model training, and marking/determining the confidence of clean data according to its fluctuation for weighting the model loss function, so that model training can be carried out with more appropriate samples and the model training convergence can be effectively improved so as to improve the model training.

The present disclosure further proposes improved model training for object recognition, wherein in the training process, an optimized training data set is obtained by adopting the training data optimization method according to an embodiment of the present disclosure, and the optimized training data set is used for model training, the training process will be iteratively performed until the training end condition is satisfied.

A conceptual flow chart of model training according to the present disclosure using the training data optimization method according to the present disclosure will be described below with reference to FIG. 4.

First, a training database containing noises is input, and the training database may include a large number of object images, such as face images. E.g., tens of thousands, hundreds of thousands, millions of object images, which may contain a certain proportion of noise images. It should be noted that the object images in the training database may also be appropriately preprocessed, as described above.

Then, a current network model is trained by using a selected loss function based on a current training database, and fluctuation scores of all training samples are calculated based on the training results, wherein the fluctuation score is only exemplary, which essentially refers to a value in any suitable form representing the fluctuation of the training sample in model training. As an example, the fluctuation score can be calculated according to a defined fluctuation score function, and the fluctuation score function can adopt any suitable function, as long as the function can obtain a value indicating the fluctuation of the training sample in the model training.

Then, clean samples and noisy samples are detected according to the fluctuation scores calculated for each sample to update a network database, so that the updated network database only contains clean samples, thus effectively avoiding application of noisy samples in the model training.

Thereafter, it can be judged whether the training ends, for example, whether the training end condition has been satisfied, and if not, it returns to the model training process, in which the updated network database is used for model training, thereby iteratively performing the aforementioned operations. On the contrary, if the training end condition is satisfied, the trained network model is output, thereby completing the model training.

In particular, it is generally possible to update parameters of a convolutional neural network by back propagation according to the calculated loss data, and use the updated network database for model training, thereby iteratively performing the aforementioned operations. Particularly, the back propagation may also include weighting the loss function according to the calculated sample fluctuation scores to update the loss function, so that the updated loss function can be used to perform subsequent model training. Alternatively, the loss function weighting operation may also be included in the aforementioned operation of training the current network model using the selected loss function, where the selection of the loss function may include the loss function weighting.

Figure 4:
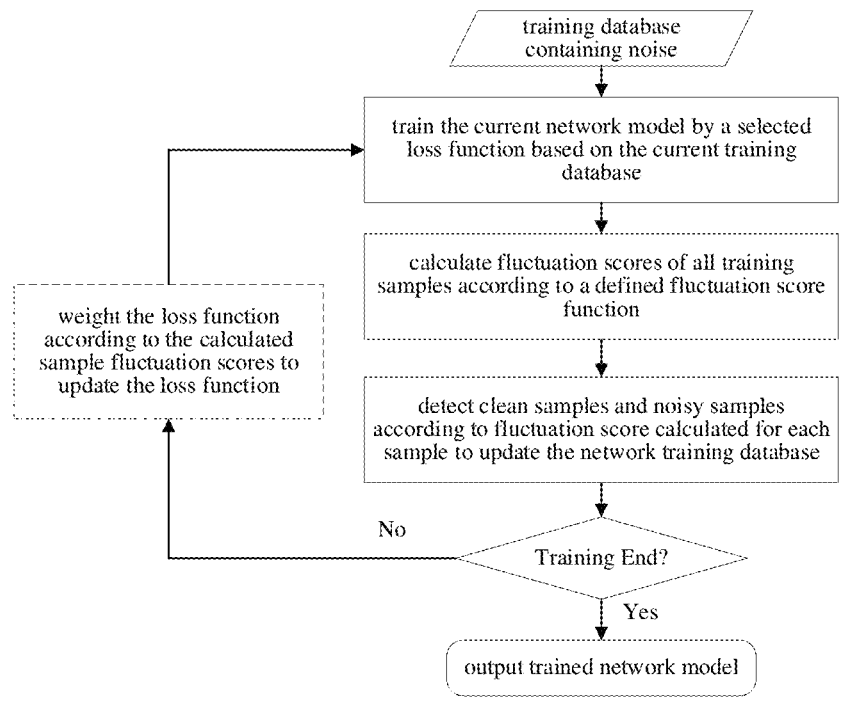
FIG. 4 shows a conceptual flow chart of a neural network model training process according to one or more aspects of the present disclosure.

It should be noted that the operation sequence as shown in FIG. 4 is only exemplary, in which the operation sequence of steps can be appropriately adjusted. As an example, the judgement of whether the training ends can be performed before updating the network database, and even before calculating the fluctuation scores.

In addition, it should be noted that the iterative operation in FIG. 4 can be applied to the aforementioned training data optimization operation in various appropriate ways. As an example, iteration may be performed for each time/round of model training, and in this case, the calculation of fluctuation scores may be performed for the current time/round of model training, for example, for all training epochs, the last predetermined number of training epochs, etc., in one time/round of training. As another example, iteration may be performed for respective training epochs, and in such a case, the calculation of fluctuation score may be performed for the current training epoch.

In this way, according to the embodiments of the present disclosure, with the increase of the training epoch, the training data can be dynamically optimized and the model training can be performed based on the optimized training data, so that the ability of recognition for deep-layer features will be gradually enhanced, while the accuracy of noise detection will also be improved, both capable of complementing each other and being gradually improved together.

Hereinafter, embodiments of sample optimization for object recognition model training and corresponding object recognition model training will be described with reference to the drawings.

Figure 5:
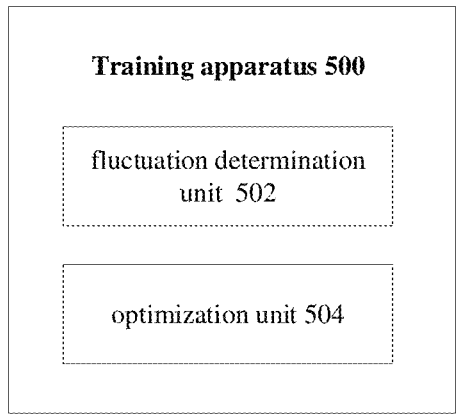
FIG. 5 shows a block diagram of a training sample optimization apparatus for object recognition model training according to one or more aspects of the present disclosure.

FIG. 5 shows a block diagram of a training sample optimization apparatus for a neural network model for object recognition according to the present disclosure. The apparatus 500 includes a fluctuation determination unit 502 and an optimization unit 504. For each training sample in a training sample database, the fluctuation determination unit 502 is configured to determine a fluctuation of model prediction of the training sample relative to a corresponding labeled identity of the training sample in a case of training the neural network model; and the optimization unit 504 is configured to determine whether the training sample can be used for subsequent training of the neural network model, based on the fluctuation of the training sample.

In an embodiment of the present disclosure, the neural network model may be any type of neural network model capable of realizing object recognition, preferably a deep neural network (DNN) model, such as a convolutional neural network (CNN) model, a recurrent neural network (RNN), and the like.

In an embodiment of the present disclosure, the model prediction of the training sample may refer to the training result/prediction result corresponding to the training sample when training the network model according to the training database, which may be represented by a feature vector, especially an embedding feature vector, for example; the corresponding labeled identity of the training sample refers to a class label identity that the training sample should be. They can be expressed in a form suitable in the art, for example, in a vector. As an example, the fluctuation indicates the deviation change between the feature vector of the training sample and its corresponding class label vector.

According to the present disclosure, the fluctuation of training sample can be determined in various suitable ways.

According to one embodiment, for a training sample in the training sample database which is available for training the neural network model in the current training, the fluctuation of the training sample can be determined based on a mathematical statistical value of the difference between a model prediction similarity and a labeled identity similarity of the training sample. According to one embodiment, a model prediction similarity of the training sample indicates a minimum value of offsets between a prediction feature of the training sample and the weight vectors representing all classes in the last full-connected layer of the neural network model, and/or a labeled identity similarity of the training sample indicates the offset between the prediction feature of the training sample and the weight vector representing a ground-truth label class in the last full-connected layer of the neural network model. As an example, the offset essentially refers to the interval between the prediction feature and the weight vector, which can be indicated by various appropriate forms, such as angle/angular distance and various appropriate function values thereof, and so on.

According to one embodiment, the model prediction similarity of the training sample is determined based on the minimum angle between a prediction feature of the training sample and the weight vectors representing all classes in the last full-connected layer of the neural network model, and/or the labeled identity similarity of the training sample is determined based on the angle between the prediction feature of the training sample and the weight vector representing the ground-truth label class in the last full-connected layer of the neural network model.

Figure 6A:
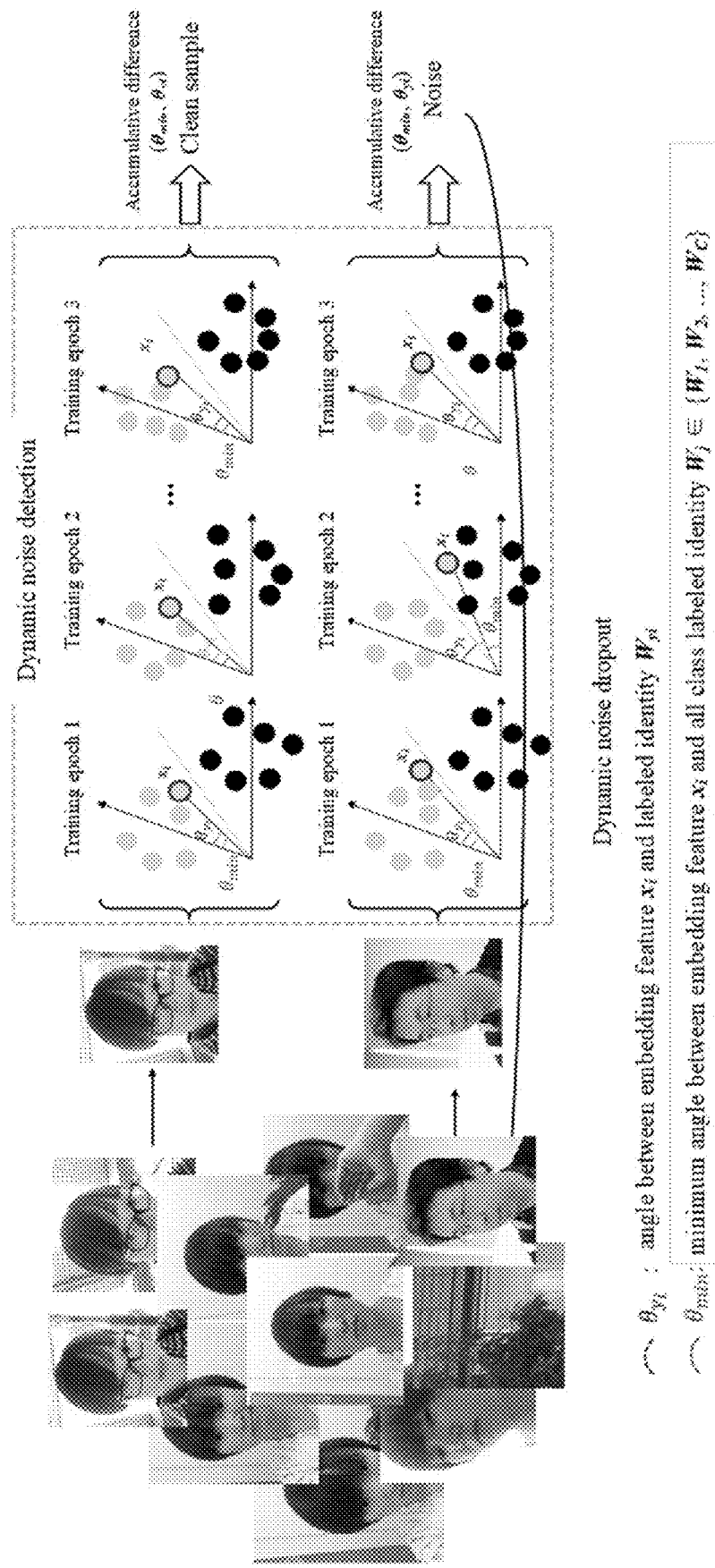
FIG. 6A schematically shows volatilities of clean samples and noisy samples in a training epoch.

FIG. 6A schematically shows exemplary volatilities of clean samples and noisy samples in a training epoch, wherein the fluctuation is determined based on an angle. $\theta_{yi}$ indicates the angle between the embedding feature $x_i$ and the labeled identity $W_{yi}$ of the training sample, and $\theta_{min}$ indicates the minimum angle between the embedding feature $x_i$ and all class labeled identities $W_j \in \{W_1, W_2, \ldots, W_C\}$. Therefore, for each of the clean sample and the noisy sample, the fluctuation of the sample in the training epoch can be determined based on the difference between $\theta_{yi}$ and $\theta_{min}$. Of course, the fluctuation can also be determined based on the difference between specific function values of $\theta_{yi}$ and $\theta_{min}$, the specific function is, for example, a cosine function. Particularly, the fluctuation is determined based on the accumulative statistical value of the angle differences.

According to one embodiment, the fluctuation of the training sample corresponds to a mathematical statistical value of accumulative values of the volatilities of the training sample in the current training and a specific number of previous training epochs. As an example, the fluctuation of the sample in the training epoch can be determined based on the mathematical statistical value of accumulative values of the difference between $\theta_{yi}$ and $\theta_{min}$ in each training epoch as mentioned previously. By way of example, the mathematical statistical value may be an average value, a median value, and any suitable statistical value. As an example, the specific number of previous training epochs may include all training epochs before the current training epoch, or may be a continuous specific number of training epochs immediately before the current training epoch, or even a specific number of training epochs satisfying specific conditions.

According to the embodiment of the disclosure, for a training sample in the training sample database which is not available for the neural network model training in the current training epoch, the fluctuation of the training sample corresponds to a mathematical statistical value of volatilities of a specific number of training samples in the training sample database that are available for training the neural network model. By way of example, the statistical value may be an average value, a median value, and any other suitable statistical value. As an example, when the training sample is a sample in the training sample database that is not available for the current model training, its similarity score difference is the average of similarity score differences of other training samples that can be used for model training in the current training epoch.

The following describes exemplary calculation of training sample fluctuation according to the present disclosure, in which the fluctuation is indicated by a fluctuation score.

As an example, the fluctuation score $F(X_i)$ of the training sample $X_i$ can be defined as:

$$F(X_i) = \frac{1}{K} \sum_{k=1}^{K} d^k(X_i) \qquad (2)$$

where, $d^k(X_i)$ represents the similarity score difference of the training sample $X_i$ in the kth training epoch, K means the number of training epochs that have been performed, and $\alpha$ is not larger than the maximum training epoch amount $K_{max}$. That is, for a training epoch, the fluctuation score of a training sample in the training epoch can be the average value of similarity score differences in each training epoch from the initial training epoch to the training epoch.

For a sample that can be used for model training in the current training epoch (for example, the kth training epoch), its similarity score difference $d^k(X_i)$ is calculated from the difference between the similarity $\cos \theta_{min}$ and $\cos \theta_{y_i}$ in the kth training epoch, that is:

$$d^k(X_i) = \cos \theta_{min}^k - \cos \theta_{y_i}^k \qquad (3)$$

Among them, $\theta_{min}=\text{minimum}\{\theta_1, \theta_2, \ldots, \theta_C\}$, and $\cos(\theta_j)=W_j^T x_i/\|W_j\|\|x_i\|$. Thus, for the training sample, if the training sample has been always involved in the model training, the fluctuation score of the sample can be $$F(X_i) = \frac{1}{K} \sum_{k=1}^{K} d^k(X_i) = \frac{1}{K} \sum_{k=1}^{K} \cos \theta_{min}^k - \cos \theta_{y_i}^k \qquad (4)$$

However, for a sample that is not used for model training in the current training epoch (for example, the kth training epoch), its similarity score difference $d^k(X_j)$ can be calculated as the average of similarity score differences of samples available for model training in this training epoch, that is:

$$d^k(X_j) = \overline{d^k(X_i)} \quad (5)$$

FIG. 6B exemplarily shows a part of an algorithm for model training using dynamic training sample optimization according to an embodiment of the present disclosure, in which as the training epoch progresses, the fluctuation scores of respective training samples can be dynamically determined, and the training samples that can be used for model training can be selected based on the fluctuation scores.

Therefore, based on the determined fluctuation of each training sample in the database, it can be determined whether the training sample is available for subsequent model training, and thus the training samples for subsequent model training can be appropriately updated according to volatilities of the training samples.

The updating of training samples can be performed in various appropriate ways. Preferably, as an example, the updating may include selecting training samples suitable for model training from the training sample database, therefore, during the training process, the training sample database does not change, while proper training samples are selected for training in every training or even every training epoch, so that all training samples in the training sample database can be fully utilized, and even if a training sample is judged as a low-quality sample in a certain training or a certain training epoch, the training sample still can be used for subsequent model training as long as it has recognition ability, and a network model with better generalization can be obtained. Of course, as another example, updating may include removing training samples from the training sample database that are not suitable for model training, so that the updated training sample database after removing the training samples can be used for model training, and the training sample database may gradually decrease with the training. It should be noted that in this example, all samples in the training sample database are used for model training, and thus the calculation of fluctuation scores of samples not used for model training as described above will not be performed.

According to one embodiment, a training sample can be used for subsequent training of the neural network model when the fluctuation of the training sample is less than a specific threshold. Especially, for a training epoch in training, it can be judged whether the training sample can be used for model training in the next training epoch according to the fluctuation of the training sample in the current training epoch.

As an example, a corresponding dropout mask can be set for a training sample according to the result of judgment that whether its fluctuation is less than a specific threshold, so that the dropout mask can be utilized for indicating whether the training sample is suitable for subsequent model training.

As an example, $M(X_i)$ can be used as the dropout mask for the training data of an image $X_i$, which is defined as follows:

$$M(X_i) = \begin{cases} 0, & F(X_i) \geq F_{thd} \\ 1, & F(X_i) < F_{thd} \end{cases} \quad (6)$$

Among them, $F(X_i)$ represents the fluctuation score of the training sample $X_i$, for example, can be calculated as described above, and $F_{thd}$ is a specific threshold. In this way, a training sample whose dropout mask is 0 will be identified as a noisy sample and excluded from model training, while a training samples whose dropout mask is 1 will be identified as a clean sample and can be used for subsequent model training. It should be noted that the above-mentioned 0 and 1 are only exemplary, and any other suitable values can be adopted as long as clean samples and noisy samples can be distinguished from each other.

According to embodiments of the present disclosure, a specific threshold for detection/selection of training samples based on fluctuation may be determined in various suitable ways.

According to one embodiment, the specific threshold is a preset fixed threshold. For example, the fixed threshold may be set by user experience, or may be set with reference to previous training results, or may correspond to specific model training/application scenarios.

According to one embodiment, the specific threshold may be a dynamic threshold, for example, it may be dynamically determined based on the volatilities of training samples. In particular, it can be dynamically determined based on the volatilities of training samples in current training or previous trainings.

According to one embodiment, the dynamic threshold can be determined based on a mathematical statistical value of volatilities in previous trainings. For example, the dynamic threshold can be determined based on the mathematical statistical value, such as average, median, maximum, etc., of volatilities of clean samples in a predetermined number of previous trainings. The predetermined number of previous trainings may be all previous trainings immediately before the current training, can be a predetermined number of continuous and previous trainings immediately before the current training, or can be a predetermined number of previous trainings before the current training arranged according to the fluctuation value from small to large, and so on.

According to one embodiment, the dynamic threshold can be determined based on the proportion of training samples in the training sample database that are available for model training and the fluctuation of each training sample in the training sample database in the current training.

As an example, it can be preset that a specific proportion of training samples in the training sample database can be used for model training in each training epoch, and this setting can be reflected on a threshold value, which can correspond to the first specific number of fluctuation values arranged from small to large, and this specific number can correspond to the product of the total number of samples in the sample database and the specific proportion.

The loss function that can be used in model training according to the present disclosure will be described below.

According to embodiments of the present disclosure, the loss function for calculating loss data may take any suitable form. As an example, a general loss function, such as an original loss function of model training, can be utilized for calculating the loss data. For example, the loss function employed in the process of model training can adopt any loss function known in the art, such as Softmax loss function and its variants, such as various known loss functions as mentioned above.

According to embodiments of the present disclosure, the loss function may be a function of angle, in particular, a cosine function of an intersection angle. Wherein, the angle is the intersection angle between an extracted feature of the training sample and a specific weight vector in the fully-connected layer of the neural network model. Particularly, the specific weight vector can be the feature center of a certain class of objects in the training image set. According to one embodiment, the model training can mainly consider the intra-class loss, and accordingly, the loss function can be a function of an intra-class intersection angle, such as a cosine function.

As an example, for example, the loss function based on softmax removes the offset term and can be converted to $W_j^T x_i = s \cos \theta_j \cos(\theta_{y_i})$. Further, an idea of big boundary can be introduced into $\cos(\theta_{y_i})$. Therefore, the loss function based on softmax can be defined as:

$$L = -\frac{1}{N}\sum_{i=1}^{N} \log P_{y_i} \qquad (7)$$

$$= -\frac{1}{N}\sum_{i=1}^{N} \log \frac{e^{sf(\theta_{y_i})}}{e^{sf(\theta_{y_i})} + \sum_{j=1, j\neq y_i}^{C} e^{s\cos\theta_j}}$$

Among them, in NSoftmax method, $f(\theta_{y_i}) = \cos \theta_{y_i}$, in CosFace method, $f(\theta_{y_i}) = \cos \theta_{y_i} - m$, and in ArcFace method, $f(\theta_{y_i}) = \cos(\theta_{y_i} + m)$.

According to embodiments of the present disclosure, loss data to be considered in model training may include both intra-class loss and inter-class loss. Therefore, the loss function used for model training can refer to a function that considers both intra-class loss and inter-class loss. As an example, it can include two sub-functions: intra-class loss function and inter-class loss function, which are respectively intra-class angle loss function and inter-class angle loss function.

According to the present disclosure, the intersection angle between the feature vectors can be directly optimized as the loss function target, without performing conversion which may cause performance degradation, so that the loss function target can be guaranteed to be consistent with the prediction process target. Specifically, the target of the loss function and the element used for judgment in the prediction process can both be angles, thus simplifying operations of determining the loss data and feeding back based on it, reducing intermediate conversion processing, reducing calculation overhead and avoiding calculation accuracy deterioration.

According to one embodiment, when the neural network model is trained by using the training sample database, the loss function for the training samples can be weighted based on the volatilities of the training samples. According to one embodiment, the loss function used in training may be a combination of a weighting function and the loss function of the neural network model. According to one embodiment, the loss function used to calculate the loss data may be the product of the loss function of the neural network model and the weighting function. Particularly, the loss function of the neural network model here refers to an original loss function that is not weighted by the weighting function, and the weighting function is a function determined based on the volatilities of the training samples, which can take any suitable form.

Preferably, in the embodiment of the present disclosure, the aforementioned training data dropout mask $M(X_i)$ for the image $X_i$ can be utilized as a weighting function to weight the loss function, so that the influence of a training sample in the training database on model training can be dynamically adjusted according to the fluctuation of the training sample. In this way, in addition to indicate whether the training sample participates in model training, $M(X_i)$ weights the loss function of the training sample accordingly.

As an example, in the loss function based on softmax, a new loss function obtained by weighting is defined as follows:

$$L = -\frac{1}{N}\sum_{i=1}^{N} M(X_i) \log P_{y_i} \qquad (8)$$

$$= -\frac{1}{N}\sum_{i=1}^{N} M(X_i) \log \frac{e^{sf(\theta_{y_i})}}{e^{sf(\theta_{y_i})} + \sum_{j=1, j\neq y_i}^{C} e^{s\cos\theta_j}}$$

Among them, $M(X_i)$, as the weighting weight for the loss function, can be determined based on the comparison result between fluctuation and a specific threshold, as mentioned above.

In this disclosure, the training data dropout mask $M(X_i)$ can be further weighted appropriately to obtain a weighted dropout mask, so that the influence of training samples on model training in the training process can be adjusted according to the characteristics of samples more appropriately.

According to one embodiment, the dropout mask $M(X_i)$ as the weighting weight for the loss function may be further determined/weighted based on the ratio of the fluctuation of the training sample to the maximum value of the volatilities of all the training samples.

As an example, $M(X_i)$ can be:

$$M(X_i) = \begin{cases} 0, & F(X_i) \geq D_{thr} \\ \left(1 - \frac{F(X_i)}{\max(F(X_i)) + \delta}\right), & F(X_i) < D_{thr} \end{cases} \qquad (9)$$

Among them, $F(X_i)$ is a fluctuation score of the training sample $X_i$, $\max(F(X_i))$ is a maximum fluctuation score corresponding to training samples in the current database, $D_{thr}$ is a sample dropout threshold, and $\delta$ is set as a small initial value which can be set arbitrarily.

Here, $M(X_i)$ essentially reflects the confidence of the training sample in the training process, where the smaller the fluctuation of the training sample is, the more suitable the training sample is for the training, and the higher its confidence in model training is, the greater the weighting weight for the loss function of the training sample is. In this way, the confidence of training sample can be used to effectively guide the training of network models.

According to one embodiment, the dropout mask $M(X_i)$ as the weighting weight for the loss function may be further determined based on the number of training epochs up to the current training.

As an example, $M(X_i)$ can be:

$$M(X_i) = \begin{cases} 0, & F(X_i) \geq D_{thr} \\ \left(1 + \text{sign}(T_{thr} - t) * \frac{F(X_i)}{\max(F(X_i)) + \delta}\right), & F(X_i) < D_{thr} \end{cases} \qquad (10)$$

Among them, $F(X_i)$ is a fluctuation score of the training sample $X_i$, $\max(F(X_i))$ is a maximum fluctuation score corresponding to training samples in the current database, $D_{thr}$ is a sample dropout threshold, and $\delta$ is set as a small initial value, $T_{thr}$ is a fixed training epoch threshold, and t is the number of current training epoch. Specifically, when the number of training epochs is less than the training epoch threshold $T_{thr}$, the weighted dropout mask for clean samples is determined as $$\left(1 + \frac{F(X_i)}{\max(F(X_i)) + \delta}\right),$$

when the number of the training epochs is equal to the training epoch threshold $T_{thr}$, it is determined that the weighted dropout mask for clean samples is 1; and when the number of training epochs is greater than the training epoch threshold $T_{thr}$, the weighted dropout mask for clean samples is determined as $$\left(1 - \frac{F(X_i)}{\max(F(X_i)) + \delta}\right).$$

Here, $M(X_i)$ also reflects the confidence of the training sample in the training process, especially further considers the influence of training epoch, in which the training sample that can reach specific stability without exceeding specific training epochs has high confidence, while a training sample that exceeds specific training epochs has low confidence.

It should be pointed out that in the calculated weighted dropout mask as mentioned above, a value of 0 indicates that the training sample can be dropped, while a value other than 0 indicates that the training sample can be reserved for model training, so that $M(X_i)$ can be used to judge whether the sample is reserved or dropped while providing weights. Also, the above-mentioned 0 and 1 are only exemplary, and any other suitable values can be employed as long as clean samples and noisy samples can be distinguished from each other.

According to the embodiments of the present disclosure, the weighting for the loss function can be performed dynamically as the training process progresses, for example, the fluctuation score of each sample is calculated in each round of training, then the loss function for each sample is weighted according to the fluctuation scores of the sample, and then the loss functions of all samples are summed to determine the total loss. In this way, the loss function can be dynamically updated based on fluctuation as the model training progresses, so that the magnitude of updating/optimization of the model can be further controlled adaptively and the updating/optimization of the model can be further improved.

According to embodiments of the present disclosure, the training data optimization of the present disclosure may be performed as the training process progresses, for example, in an iterative manner. As an example, it can be judged whether the trained neural network model satisfies the end condition after model training in the process of training, and if the trained neural network model does not satisfy the end condition, subsequent model training and data optimization will be carried out, the iterative training and optimization will proceed until the trained neural network model satisfies the end condition.

According to one embodiment, the training end conditions may be various suitable end conditions frequently used in the field of model training. As an example, a specific condition may be related to the training result or adjustment times. As an example, the end condition can be at least one of the following: the number of training epochs reach a predefined maximum number of training epochs; and the calculated loss of the neural network model is lower than a predefined threshold, and the difference between the current training result and the previous training result is less than the predefined threshold, and so on.

As an example, when a predetermined number of adjustments is reached, the parameter adjustment will not be performed. As another example, the selection can be based on the comparison between the current training result and the previous training result. The training result can be, for example, loss data determined by the model determined by this training. If the current training result is worse than the previous training result, the parameter adjustment will not be performed, but if the current training result is better than the previous training result, the parameter adjustment will proceed according to the previous parameter adjustment mode, until a preset number of adjustment is reached or the training result is no longer optimized.

It should be noted that FIG. 5 only illustrates an overview diagram of structural configuration of the training sample optimization apparatus, and the apparatus may further include other possible units/components (for example, a memory, etc.).

According to embodiments of the present disclosure, the apparatus may further include an image feature acquisition unit configured to acquire image features from a training image set using the neural network model. The acquisition of image features can be performed in a manner known in the art, which will not be described in detail here. Of course, the image feature acquisition unit may be located outside the apparatus according to the present disclosure.

According to embodiments of the present disclosure, the storage may store various information (for example, image features of the training set, loss data, function parameter values, etc.) generated by the training apparatus, programs and data used for operation of the training apparatus, and the like. For example, the storage may include, but is not limited to, random access memory (RAM), dynamic random access memory (DRAM), static random access memory (SRAM), read-only memory (ROM), and flash memory, etc. As an example, the storage may also be located outside the training apparatus. The training apparatus may be directly or indirectly (for example, other components may be interposed therebetween) connected to the storage for data access. The storage may be a volatile storage and/or a non-volatile storage.

It should be noted that the above units can be logical modules divided according to specific functions they implement, and are not used to limit specific implementations, for example, they can be implemented in software, hardware, or a combination of software and hardware. In actual implementation, the foregoing units may be implemented as independent physical entities, or may be implemented by a single entity (for example, a processor (CPU or DSP, etc.), an integrated circuit, etc.). In addition, the above-mentioned individual units are shown by dashed lines in the figure to indicate that these units may not actually exist, and the operations/functions they implement may be realized by the processing circuitry itself.

It should be noted that in addition to including a plurality of units, the above-mentioned training apparatus may be implemented in various other forms, such as a general-purpose processor or a dedicated processing circuit such as an ASIC. For example, the training apparatus can be configured by a circuit (hardware) or a central processing device such as a central processing unit (CPU). In addition, the training apparatus may carry a program (software) for operating a circuit (hardware) or a central processing device. The program can be stored in a storage (such as arranged in the storage) or an external storage medium connected from the outside, and downloaded via a network (such as the Internet).

Figure 7:
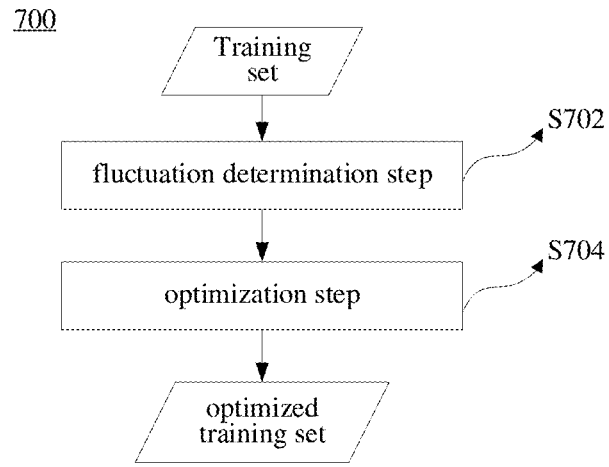
FIG. 7 shows a flow chart of a training sample optimization method for object recognition model training according to one or more aspects of the present disclosure.
Figure 8:
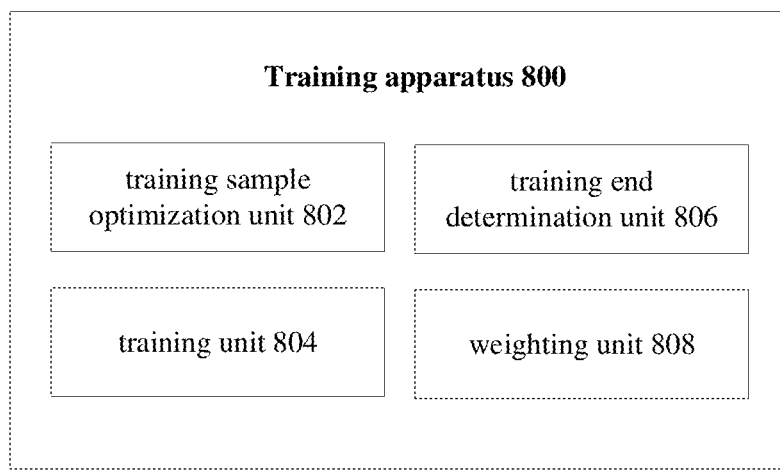
FIG. 8 shows a block diagram of an object recognition model training apparatus according to one or more aspects of the present disclosure.

According to an embodiment of the present disclosure, a method of optimizing training samples for a neural network model for object recognition is proposed, as shown in FIG. 7, the method 700 comprises a fluctuation determination step S702 and an optimization step S704, wherein for each training sample in a training sample database, the fluctuation determination step S702 is adapted to determine a fluctuation of model prediction of the training sample relative to a corresponding labeled identity of the training sample in a case of training the neural network model; and the optimization step S704 is adapte to determine whether the training sample can be used for subsequent training of the neural network model, based on the fluctuation of the training sample. Through the above operations, the optimized training samples can be obtained for model training.

According to embodiments of the present disclosure, the method may further include an image feature acquisition step that is adapted to acquire image features from a training image set using the neural network model. The acquisition of image features can be performed in a manner known in the art, which will not be described in detail here. Of course, the image feature acquisition step may not be included in the method according to the present disclosure.

It should be noted that the method of optimizing training samples according to the present disclosure may also include various operations described above, which will not be described in detail here. It should be noted that respective steps/operations of the method of optimizing training samples according to the present disclosure can be performed by the above-mentioned units, and may also be performed by various forms of processing circuits.

According to the present disclosure, a neural network model training apparatus 800 for object recognition is proposed, which includes a training sample optimization unit 802 configured to, for a given training sample database, optimize a training sample database for neural network model training by using the training sample optimization apparatus according to embodiments of the present disclosure; and a training unit 804 configured to train the neural network model by utilizing the optimized training sample database. It should be noted that, as an example, the training sample optimization unit may be implemented as the training sample optimization apparatus according to the present disclosure, or may be implemented as a unit that can operate by using the training sample optimization apparatus according to the present disclosure.

According to an embodiment of the present disclosure, the training apparatus 800 further includes an end determination unit 806 configured to determine whether the trained neural network model satisfies the training end condition. Among them, if it is determined that the trained neural network model does not satisfy the training end condition, optimization and training are further performed by the training sample optimization unit and the training unit with the optimized training sample database. The training end condition can be as described above, and will not be described in detail here.

According to an embodiment of the present disclosure, the training apparatus 800 may further include a weighting unit 808 configured to weight the loss function for the training sample based on the fluctuation of the training sample. In particular, as an example, with reference to the dropout mask for each training sample, the weighting unit may only weight the loss functions for the training samples used for neural network model training, and the weighting operation may be performed as described above. However, for training samples that do not participate in neural network model training, weighting may not be performed, or even if weighting is performed, because the loss function for the sample can be set to 0, the weighted loss function is still 0.

It should be noted that the above-mentioned end determination unit and weighting unit may also be included in the training sample optimization unit, for example, in the training sample optimization apparatus according to the present disclosure, or may be located outside the training apparatus according to the present disclosure, as indicated by dashed lines in the drawings. According to an embodiment of the present disclosure, the apparatus may further include the image feature acquisition unit as described above, but the image feature acquisition unit may also be located outside the training apparatus.

Figure 9:
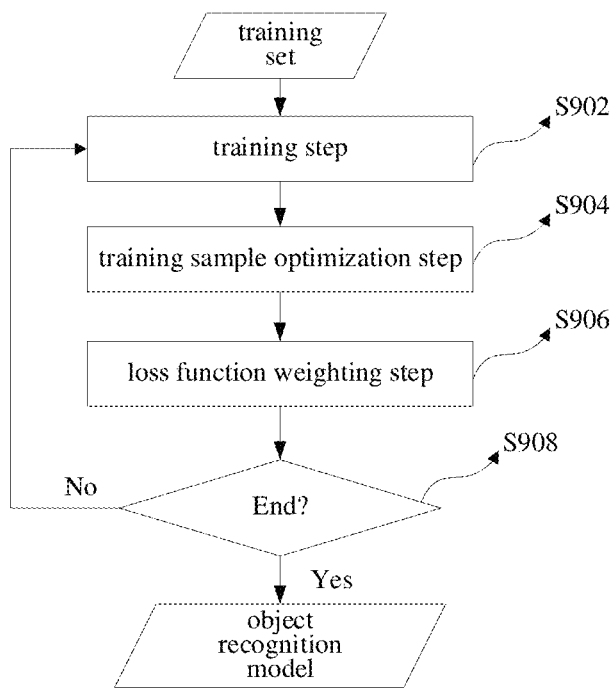
FIG. 9 shows a flowchart of an object recognition model training method according to one or more aspects of the present disclosure.

According to the present disclosure, a neural network model training method for object recognition is proposed. As shown in FIG. 9, the method 900 includes a training step S902 adapted to train the neural network model by utilizing a training sample database and a training sample optimization step S904 adapted to optimize the training sample database for neural network model training by using the training sample optimization method according to embodiments of the present disclosure. It should be pointed out that at the beginning of training, this training step can use an initial training sample database to perform the neural network model training, and as the training progresses, this training step will use optimized training samples for training.

According to an embodiment of the present disclosure, the method 900 may further include a weighting step S906 adapted to weight the loss function for the training sample based on the fluctuation of the training sample; and a training end determination step S908 adapted to determine whether the trained neural network model satisfies the training end condition. When the training is not finished, the training step and the training sample optimization step will be repeatedly performed.

It should be noted that the above-mentioned end determination step and weighting step can also be included in the training sample optimization step, for example, in the training sample optimization method according to the present disclosure, or located outside the training method according to the present disclosure, as indicated by dashed lines in the drawings. According to an embodiment of the present disclosure, the method may further include the image feature acquisition step as described above, but the image feature acquisition step may also be located outside the training method.

It should be noted that the execution sequence of each step in the method shown in FIG. 9 is only exemplary, wherein the operation sequence of each step can be appropriately adjusted. As an example, the end determination step may be performed before the training sample optimization step or even before the weighting step, so that if it is determined that the training can finish after the current training is performed, it is not necessary to perform training sample optimization and loss function weighting.

It should be noted that the method of model training according to the present disclosure may also include various operations described above, which will not be described in detail here. It should be noted that respective steps/operations of the model training method according to the present disclosure can be performed by the above-mentioned units, and may also be performed by various forms of processing circuits.

Figure 10:
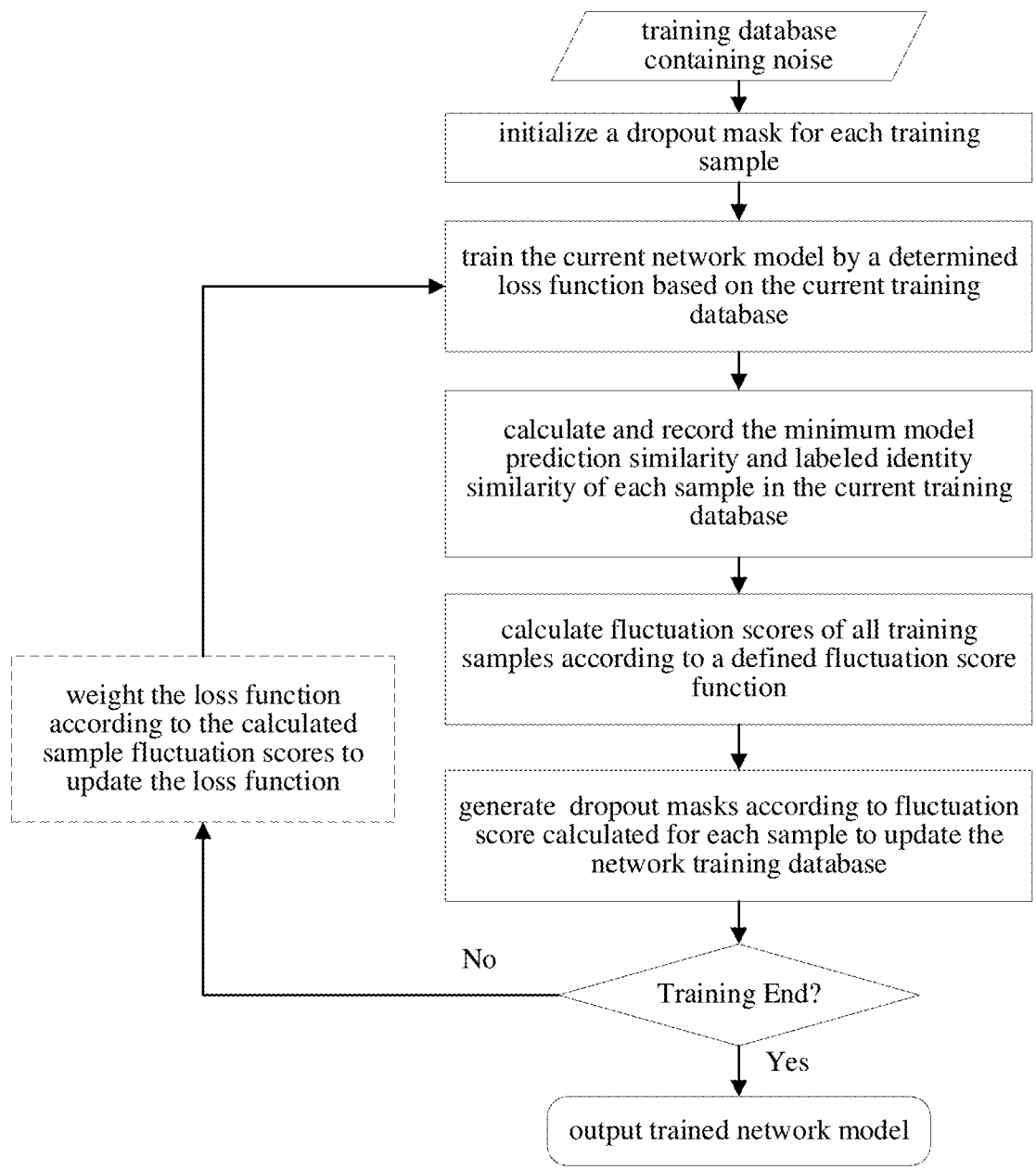
FIG. 10 shows a flowchart of an exemplary neural network model training process according to one or more aspects of the present disclosure.

An exemplary implementation of the model training operation according to the present disclosure will be described below with reference to FIG. 10.

First, a training database containing noises is input, and the training database may include a large number of object images, such as face images. E.g., tens of thousands, hundreds of thousands, millions of object images, which may contain a certain proportion of noise images. It should be noted that the object images in the training database may also be appropriately preprocessed, as described above.

Then, a dropout mask for each training sample is initialized, for example, the dropout mask for each training sample can be set to 1, so as to indicate that all training samples can be used for model training.

Then, according to the current training database, the determined loss function can be utilized for training the current network model, so as to obtain the model prediction result of each sample, where the loss function can be any suitable function, such as various loss functions as mentioned above.

Then, the minimum model prediction similarity and labeled identity similarity of each sample in the current training database are calculated and recorded, and thus the fluctuation scores of all training samples are calculated. The calculation operation here can be performed as described above.

Then, a dropout mask for each training sample can be generated according to the calculated fluctuation score of each sample, for example, the fluctuation score is compared with a threshold value to generate the dropout mask as described above, so that clean samples and noisy samples can be detected/distinguished from each other to update the network database, so that the updated network database contains only clean samples for performing model training.

After that, it can be judged whether to end the training, for example, whether the training end condition has been satisfied, and if not, it returns to the model training process. In particular, it is generally possible to update parameters of a convolutional neural network by back propagation according to the calculated loss data, and use the updated network database for model training, thereby iteratively performing the aforementioned operations. Particularly, the back propagation may also include weighting the loss function according to the calculated sample fluctuation scores to update the loss function, so that the updated loss function can be used for subsequent model training. The loss function updating can be defined as above, and will not be described. Alternatively, the loss function weighting operation may also be included in the aforementioned operation of training the current network model using the determined loss function, where the determination of the loss function may include the loss function weighting.

On the contrary, if the training end condition is satisfied, the trained network model is output, thereby the model training finishes.

In the following, the effect of the model training method according to this disclosure and that in the prior art technologies will be compared through experiments. The experiment aims to verify the effects on a small-scale training set, and the settings in the experiment are as follows:

Training set: CASIA (Institute of Automation, Chinese Academy of Sciences)-WebFace, including 10,000 personal identities, a total of 500,000 images.

Test sets: LFW (Labeled Faces in the Wild), CFP-FP (Celebrities in Frontal Profile-Frontal Profile), AGEDB (Age Database) –30, CPLFW (Cross-Posture LFW), CALFW (Cross-Age LFW), IJB (Intelligence Advanced Research Projects Activity (IARPA): IARPA Janus Benchmark)-C Evaluation criteria: 1:N TPIR (True Positive Identification Rate, Rank1 @$10^6$), and TPR/FPR (True Positive Rate/False Positive Rate)

Convolutional neural network architecture: RestNet (Residual Network) 50 prior art technologies to be compared: ArcFace, Sub-center ArcFace

The experimental results are shown in Table 1 and Table 2 below, which illustrate that the solution of the present disclosure has better performance than that of the prior art, and particularly achieve better model recognition performance.

TABLE 1

Comparison between the result of the present solution with that of the prior art technologies on a common data set

| algorithm | YTF (YouTube Faces) | LFW | CFP-FP | AGEDB | CPLFW | CALFW | Avg. |
|---|---|---|---|---|---|---|---|
| ArcFace (m = 0.5, s = 64) | 99.52% | 95.60% | 95.30% | 89.97% | 93.77% | 94.83% | 99.52% |
| Sub-centerArcFace (m = 0.5, s = 64) | 99.62% | 95.17% | 95.45% | 89.87% | 93.98% | 94.82% | 99.62% |
| The solution of the present disclosure | 99.53% | 95.86% | 95.28% | 90.70% | 94.30% | 95.13% | 99.53% |

TABLE 2

Comparison between the result of the present solution and that of the prior art technologies on IJB-C data set

| algorithm | IJB-C loose crop dataset | | |
|---|---|---|---|
| | 10-5 | 10-4 | 10-3 |
| ArcFace(m = 0.5, s = 64) | 70.15% | 81.48% | 90.26% |
| Sub-centerArcFace (m = 0.5, s = 64) | 79.76% | 87.03% | 92.47% |
| The solution of the present disclosure | 80.39% | 87.69% | 92.87% |

Especially, considering that the prediction features and label features of the model obtained in different training periods are stable for clean samples and unstable for noisy samples, which can be used to distinguish clean samples from noisy samples. In each training epoch, the solution of the present disclosure determines the fluctuation scores of defined training samples according to the prediction features of the model, and then detects and excludes the most suspicious noisy samples in the training epoch from the model training, so that an appropriate training database can be obtained. And as the training epochs progress, the fluctuation scores of training samples can be dynamically updated, and the detected noisy samples can be dynamically dropped in each training epoch based thereon, thus optimizing the training database step by step.

Furthermore, preferably, in the solution of the present disclosure, the training sample optimization in each training epoch is performed based on an initial training sample database, so that all training samples in the training sample database can be fully utilized, and even if a training sample is judged as a noisy sample in a certain training or a certain training epoch, the training sample still can be used as a clean sample for subsequent model training as long as it has recognition ability, and a network model with better generalization can be obtained.

In addition, in the solution according to the present disclosure, the optimized training database can be used for training a more accurate network model with better performance. Moreover, as the training epochs progress, the optimized training database can be used to train a more accurate network model dynamically, so that the model training and noise detection can promote each other, and with increase of the training epochs, improve the recognition ability gradually. In particular, with increase of the number of training epochs, the recognition abilities of depth features will be gradually enhanced, and the accuracy of noise detection will also be improved. Both can learn from each other and gradually improve together.

In addition, the solution according to the present disclosure can be applied to the current existing training database, and can be combined with the existing loss function, thereby improving the recognition performance of the trained model. Preferably, the solution according to the present disclosure can also use the fluctuation scores of training samples to weight the existing loss function, and then further optimize the model training and improve the recognition performance of the trained model.

Exemplary implementations according to the present disclosure will be described below with reference to the accompanying drawings in detail. It should be pointed out that the following description mainly aims to clearly explain the training operation process according to the present disclosure, but some steps or operations are not necessary, for example, the pre-processing step and the feature extraction step are not necessary, and the operations according to the present disclosure can be directly performed based on the received features.

Figure 11:
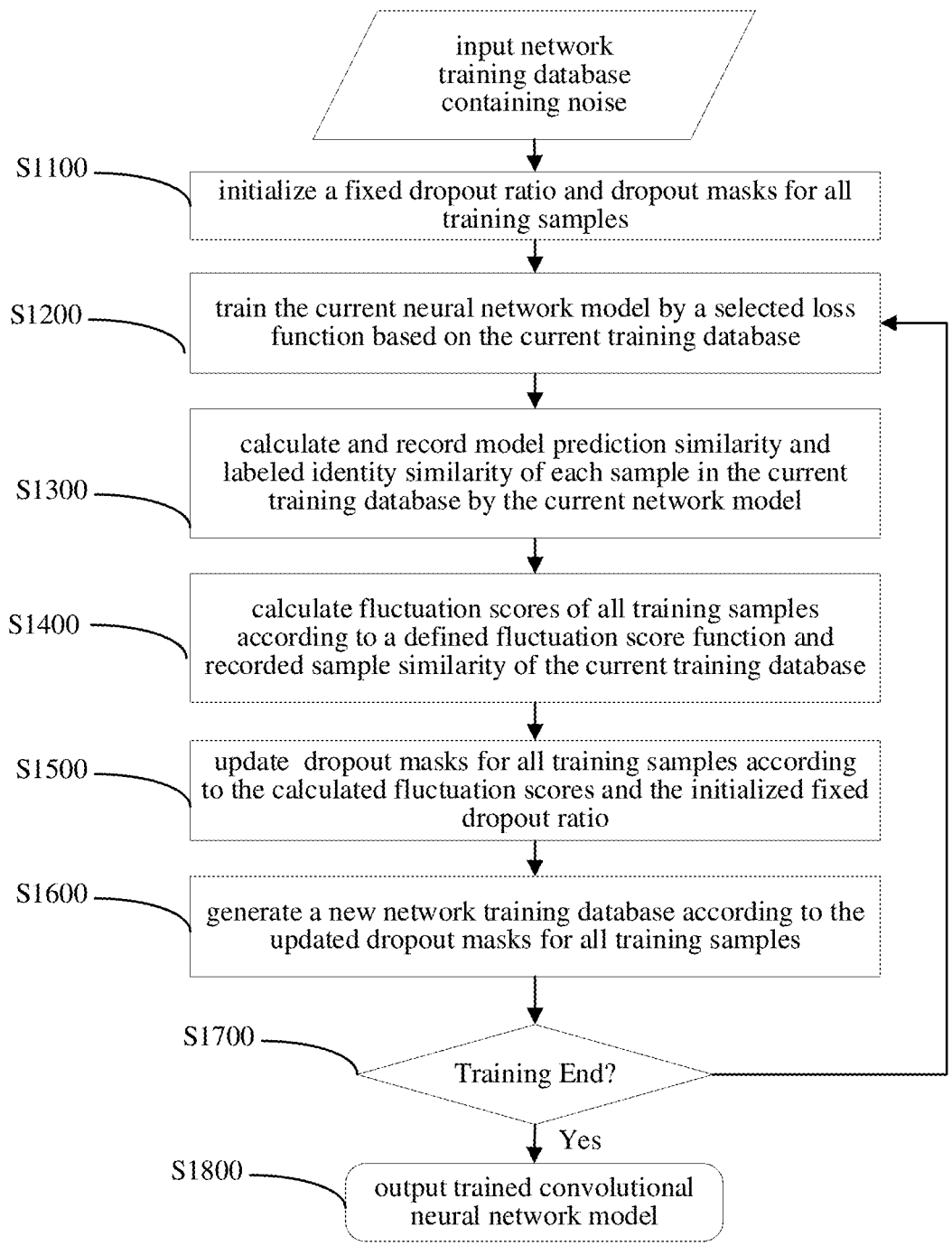
FIG. 11 shows a flow chart of object recognition model training according to one or more aspects of the present disclosure.

An object recognition model training process according to the first embodiment of the present disclosure will be described below. In the first embodiment, for a large-scale training database containing noisy samples, dynamic training sample optimization with a fixed dropout ratio is performed, and an object recognition model is trained based thereon. FIG. 11 shows a flow chart of object recognition model training according to the first embodiment of the present disclosure, wherein the object recognition model is, for example, a convolutional neural network model.

S1100: initialize dropout masks and fixed dropout ratio for all training samples In this step, the input is an initial training database with noise. For example, the database can include any suitable images, including original images, even pre-processed images, such as the training data satisfying the requirement of convolutional neural network which can be converted from the input original images through a series of existing preprocessing operations, including face or object detection, face or object alignment, image augmentation, image normalization, and so on.

For all N training samples in the initial training database, the dropout masks corresponding to all training samples are initialized to be 1, which means that all training samples are used to train the convolutional neural network model in the first training epoch, and the dropout ratio is set as a fixed value between (0,1).

S1200: train the current neural network model based on the current training database by using a selected loss function In this step, the input is the current network database for which the current dropout masks are set. Specifically, in the first training epoch, the input is the initial training database with the initial dropout masks set, and in the subsequent training epoch, the input is the network database for which the dropout masks are updated according to volatilities of training samples. Then, the selected convolutional neural network structure and the selected loss function are used to train the current convolutional neural network. The structure of convolutional neural network can be common network structure, such as VGG16, ResNet, SENet, and so on. The loss function can be a softmax-based loss function which has been proposed, such as NSoftmax, CosFace, ArcFace, and so on.

S1300: according to the current network model, calculate and record similarities of model prediction and labeled identity of each sample in the current training database In this step, for each sample of the current training database, a corresponding embedding feature and the last fully-connected layer of the convolutional neural network being trained currently are extracted from the convolutional neural network model being trained currently, and then a cosine similarity corresponding to a minimum intersection angle between the embedding feature extracted for the training sample and the weight vectors representing all classes in the last fully-connected layer of the neural network model is used as the similarity of its model prediction; meanwhile, a cosine similarity corresponding to the intersection angle between the embedding feature extracted for the training sample and a weight vector representing a ground-truth label class in the last fully-connected layer of the neural network model is used as the similarity of its labeled identity; finally, record the model prediction similarity and labeled identity similarity of all samples in the current training database. As an example, these similarities can be recorded in a specific storage device, such as an external memory, an internal cache, and the like.

S1400: calculate fluctuation scores of all training samples according to a defined fluctuation score function and the recorded sample similarities of the current training database In this step, the input is the model prediction similarity and labeled identity similarity of all samples in the current training database recorded in step S1300. For training samples in the current training database, such as training samples in the initial training database that can participate in the current model training, firstly, the difference score corresponding to the training samples are calculated according to the recorded model prediction similarity and labeled identity similarity of the training sample, and then the fluctuation scores of the training samples are accumulatively calculated by using the defined fluctuation score function, for example, the accumulative value, accumulative average value or any other appropriate mathematical statistical value of the fluctuation scores of the training samples in all training epochs from the initial training epoch to the current training epoch; for training samples that are not in the current training database, such as training samples in the initial training database that do not participate in the current model training, first calculate the average value of the difference scores corresponding to all training samples according to the recorded model prediction similarity and labeled identity similarity of all training samples in the current training database, and then accumulatively calculate the fluctuation scores of the training samples by using the defined fluctuation score function, such as the accumulative value, the accumulative average value or any other appropriate mathematical statistical value of the fluctuation scores mentioned above.

S1500: update the dropout masks for all training samples according to the calculated fluctuation scores and the initialized fixed dropout ratio In this step, the input are the fluctuation scores of all training samples calculated in step S1400, firstly, all training samples are sorted in descending order according to their fluctuation scores. the larger the fluctuation score of a training sample is, the more unstable the prediction and ground-truth label of the training sample are. Then, according to the initialized fixed dropout ratio α, the number of training samples that can be dropped is calculated as M=N*α; finally, the dropout masks for the first M training samples are set to 0, and the dropout masks for the last N-M training samples are set to 1. The specific calculation formula of dropout mask function is defined as follows:

$$M(X_i) = \begin{cases} 0, & F(X_i) \text{ in the first } N*a \\ 1, & F(X) \text{ not in the first } N*a \end{cases} \quad (11)$$

Among them, $F(X_i)$ is the fluctuation score of the training sample $X_i$, α is a fixed dropout ratio, and N is the number of all training samples.

It should be pointed out that setting the dropout mask based on a fixed dropout ratio can also be equivalent to setting the dropout mask based on a specific threshold, and accordingly, the specific threshold can correspond to the N*α-th fluctuation score in the case of sorting the fluctuation scores in descending order, so that the dropout mask for a training sample whose fluctuation is less than the specific threshold is set to 1, while the dropout mask for a training sample whose fluctuation is greater than or equal to the specific threshold is set to 0.

S1600: generate a new network database according to the updated dropout masks for all the training samples In this step, the input are the dropout masks for all training samples calculated in step S1500, and training samples with dropout masks greater than 0 are added to the new network database, while the training samples with dropout masks of 0, which means that they are detected noisy samples, will not be added to the new network database.

S1700: judge whether to end the training process

In this step, it can be judged whether to end the training by means of some preset thresholds, such as whether the current loss is less than a given threshold, or whether the number of current training iteration epochs reach a given maximum number of training epochs, and so on. If the condition is satisfied, the network model training is finished; Otherwise, continue to the next training epoch, that is, take the generated new network database as the current training database to perform the aforementioned steps S1200-S1600. It should be noted that, although not shown, when the next training epoch is iteratively executed, the parameters of the convolutional neural network are always updated based on the calculated loss data by Back propagation, and then the updated training database is used for model training, that is, the updated training database and the convolutional neural network are used to perform the operations in S1200-S1600 as mentioned above.

In addition, it should be noted that step S1700 can be located at other positions in the training process, for example, it can be located at any position after step S1200 or even before steps S1300-S1600, so that if the end condition is satisfied, the network model training can finish directly without executing the fluctuation score calculation, dropout mask setting and the model training database updating in the current training epoch. On the contrary, if the end condition is not satisfied, operations corresponding to steps S1300-S1600 will be executed again.

S1800: output the trained convolutional neural network model

In this step, the current parameters of all layers in the convolutional neural network structure indicate the trained network model, and the network model and the corresponding parameter information can be output.

The solution according to the first embodiment is especially suitable for a case that the noise ratio in the large-scale training database is roughly estimated, so that for the large-scale training database containing noisy samples, the fixed proportion of noisy samples can be dropped according to the volatilities of samples to obtain an optimized large-scale training database, and then a more stable network model can be trained based thereon. Preferably, the current training database used for each training epoch can be generated based on the initial training database, so that training can be performed by using more diverse training samples, and the recognition ability of the obtained training model can be further improved.

Figure 12:
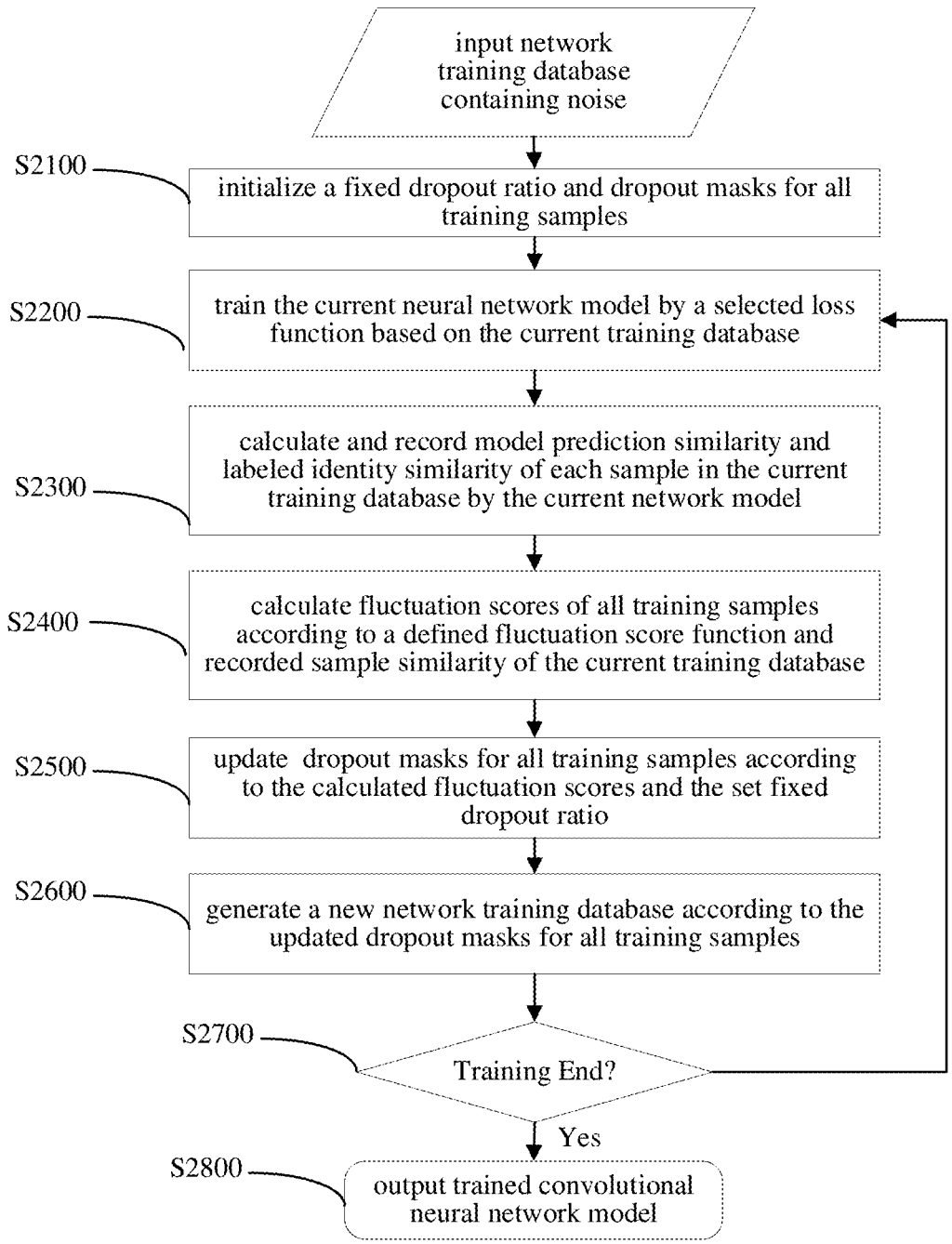
FIG. 12 shows a flow chart of object recognition model training according to one or more aspects of the present disclosure.

An object recognition model training process according to a second embodiment of the present disclosure will be described below. In the second embodiment, for a large-scale training database containing noisy samples/low-quality samples, a fixed dropout threshold is used for dynamic training sample optimization, and an object recognition model is trained based thereon. FIG. 12 shows a flow chart of an object recognition model training according to the second embodiment of the present disclosure, wherein the object recognition model is, for example, a convolutional neural network model.

S2100: initialize dropout masks and fixed dropout threshold for all training samples In this step, the input is an initial training database with noisy samples, which can be the same as that in the aforementioned step S1100.

For all N training samples in the initial training database, the dropout masks corresponding to all training samples are initialized to be 1, which means that all training samples are used to train the convolutional neural network model in the first training epoch, and a fixed dropout threshold is set, which can be set according to experience or according to a statistical value of dropout thresholds used in historical training, such as average value.

Then, steps S2200 to S2400 will be executed, and the operations of these steps can be executed as the aforementioned steps S1200 to S1400, as seen in the previous description of steps S1200 to S1400, and will not be described in detail here.

S2500: update the dropout masks for all training samples according to the calculated fluctuation score and the set fixed dropout threshold In this step, the input are the calculated fluctuation scores of all training samples, and the fluctuation scores of all training samples are compared with the initialized fixed dropout threshold $D_{thr}$, if the fluctuation score of a training sample is less than the threshold, which means that the prediction and the ground-truth label of the training sample are stably consistent, the training sample is a clean sample, and its dropout mask is set to 1; if the fluctuation score of the training sample is greater than or equal to the threshold, which means that the prediction and the ground-truth label of the training sample are unstable, the training sample is judged as a noisy sample, and its dropout mask is set to 0. The specific dropout mask calculation formula can be as the aforementioned formula (6).

Then, steps S2600 to S2800 will be executed, and the operations of these steps can be executed as the aforementioned steps S1600 to S1800, as seen in the previous description of steps S1600 to S1800, which will not be described in detail here.

The solution according to the second embodiment of the present disclosure can dynamically optimize the samples and scale of the training database, and can dynamically dropout noisy samples and low quality samples therefrom, instead of using only the training database with fixed scale to perform model training. Furthermore, preferably, the current training database used in each training epoch can be dynamically generated based on the initial training database, so that low-quality samples with recognition ability can be retained in the training database, and thus a network model with better generalization can be trained.

Figure 13:
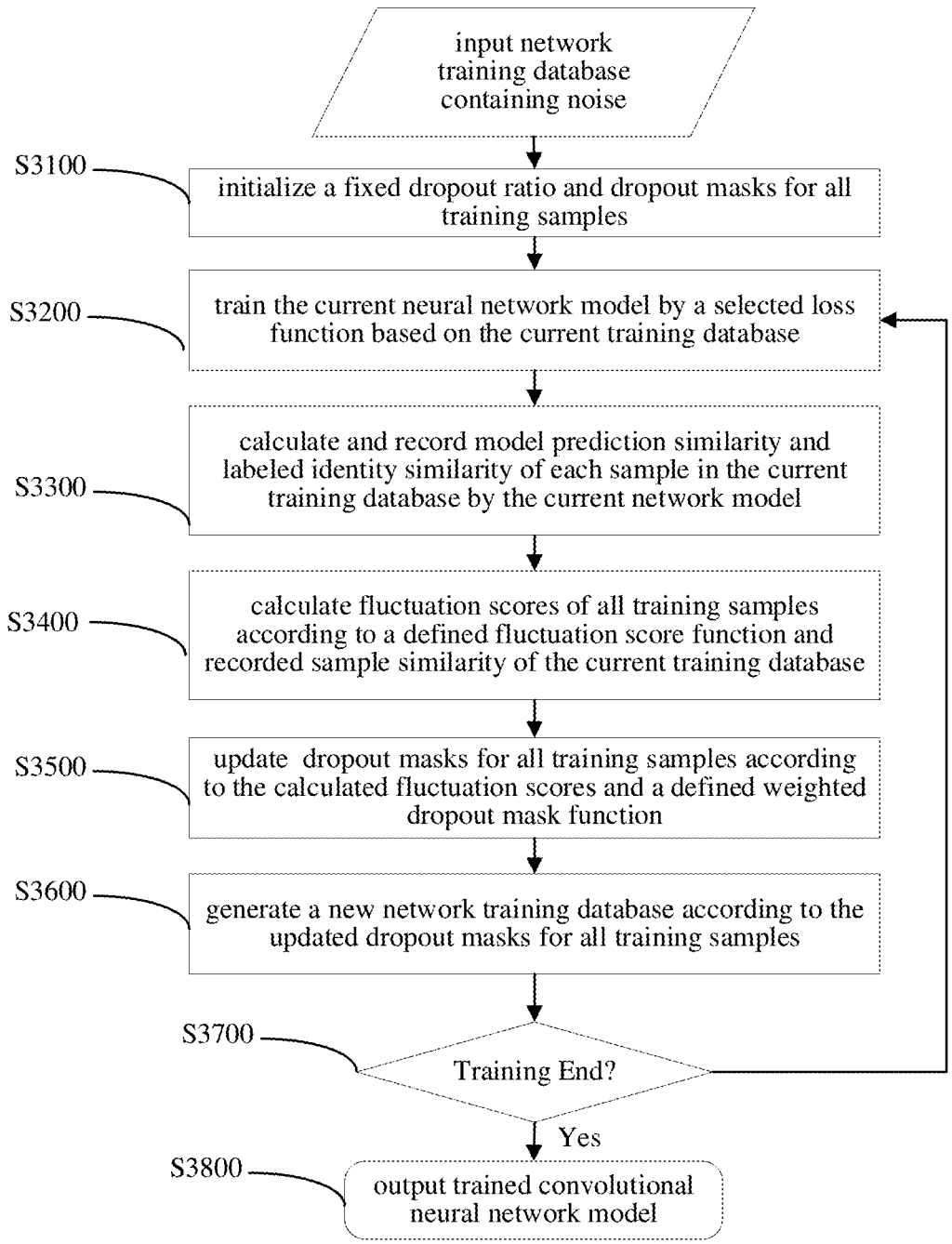
FIG. 13 shows a flow chart of object recognition model training according to one or more aspects of the present disclosure.

An object recognition model training process according to a third embodiment of the present disclosure will be described below. In the third embodiment, for a large-scale training database containing noisy samples/low-quality samples, a weighted dropout threshold is used for dynamic training sample optimization, and an object recognition model is trained based thereon. FIG. 13 shows a flow chart of an object recognition model training according to the third embodiment of the present disclosure, wherein the object recognition model is, for example, a convolutional neural network model.

At first, step S3100 can be executed as the aforementioned step S2100, as seen in the previous description of step S2100, which will not be described in detail here.

Then, at step S3200, the current neural network model is trained by using the selected loss function according to the current training database.

This step is basically the same as S1200, as seen in the description of S1200. It should be noted that in this embodiment, each training sample in the new network database has its corresponding weight mask, which indicates the confidence of the training sample. Therefore, during the process of training the network model, the loss calculated by the training sample can be further weighted by its weight mask, that is, the influence of the training sample on model training is dynamically adjusted according to its weight, and thus the influence of the training samples in the training database on model training can be adjusted dynamically. As an example, the weight mask for a training sample can be represented by a weighted dropout mask for the training sample.

In other words, this is equivalent to the loss function selected in the model training being a weighted loss function, that is, the loss function corresponding to a training sample can be a loss function weighted by the weighted dropout mask for the training sample, such as the form of the aforementioned formula (8), in which $M(X_i)$ corresponds to the weighted dropout mask, that is, the weight mask corresponding to the sample.

Then, steps S3300 to S3400 will be executed, and the operations of these steps can be executed as the aforementioned steps S1300 to S1400, as seen in the previous description of steps S1300 to S1400, which will not be described in detail here.

S3500: update the dropout masks for all training samples according to the calculated fluctuation score and a defined weighted dropout mask function In this step, the input are the fluctuation scores of all training samples calculated in the step S3400, and the fluctuation scores of all training samples are compared with the initialized fixed dropout threshold $D_{thr}$, if the fluctuation score of a training sample is less than the threshold, which means that the prediction and the ground-truth label of the training sample are stably consistent, the training sample is a clean sample, and its dropout mask can be calculated by a defined weighted dropout mask function; if the fluctuation score of the training sample is greater than or equal to the threshold, which means that the prediction and the ground-truth label of the training sample are unstable, the training sample is judged as a noisy sample, and its dropout mask is set to 0. The specific calculation formula of weighted dropout mask function can be as the aforementioned formula (9). As mentioned above, the obtained weighted dropout mask can be utilized as the weight for weighting the loss function.

Then, steps S3600 to S3800 will be executed, and the operations of these steps can be executed as the aforementioned steps S1600 to S1800, as seen in the previous description of steps S1600 to S1800, which will not be described in detail here.

The third embodiment according to the present disclosure can drop noisy samples and low-quality samples dynamically, while the confidences of training samples in the current network database can be used to guide the training of neural network effectively, that is, the confidences of training samples are set based on the volatilities of training samples, and the influences of training samples on model training are dynamically adjusted accordingly, which can accelerate the convergence of network model training. Furthermore, preferably, the current training database used in each training epoch can be dynamically generated based on the initial training database, so that low-quality samples with recognition ability can be retained in the training database, and thus a network model with better generalization can be trained.

Figure 14:
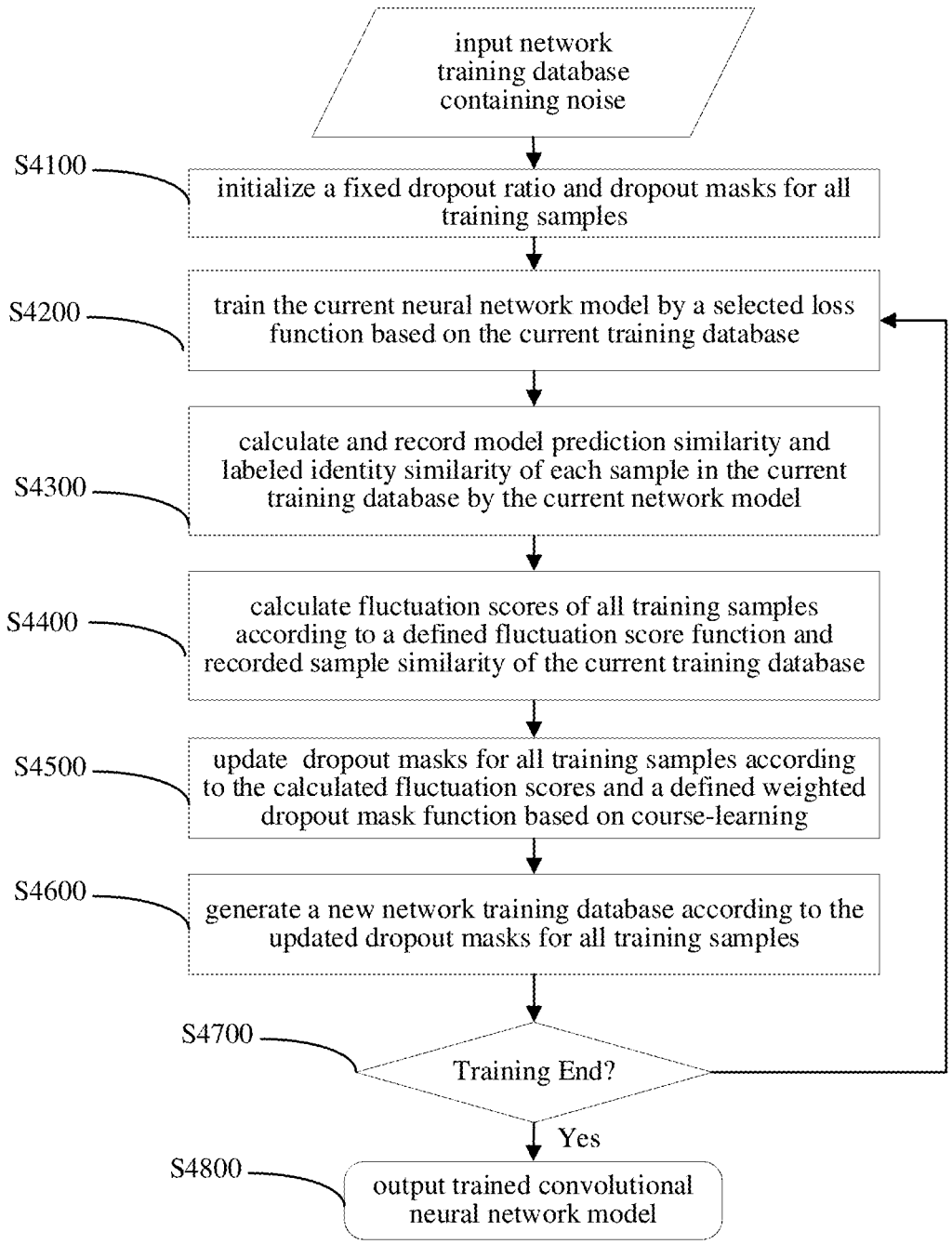
FIG. 14 shows a flow chart of object recognition model training according to one or more aspects of the present disclosure.

An object recognition model training process according to a fourth embodiment of the present disclosure will be described below. In the fourth embodiment, for a large-scale training database containing noisy samples/low-quality samples, a weighted dropout mask is used for dynamic training sample optimization, and the object recognition model is trained based thereon. In particular, the weighted dropout mask here further considers the number of the executed training epochs, so that dynamic training sample optimization can be performed based on the number of the executed training epochs, which can also be referred to as dynamic training sample optimization based on course learning. FIG. 14 shows a flowchart of object recognition model training according to the fourth embodiment, wherein the object recognition model is, for example, a convolutional neural network model.

S4100: initialize dropout mask, fixed dropout threshold and fixed training epoch threshold for all training samples In this step, the input is an original training database containing noisy samples, which can be the same as that in the aforementioned step S1100.

In this step, an original network database containing noisy samples is input, and according to the number N of training samples in the original network database, the dropout masks corresponding to all training samples are initialized to be 1, which means that all training samples are used to train the convolutional neural network model in the first training epoch, and additionally, a fixed dropout threshold can be set as mentioned above, and a fixed training epoch threshold can also be set, which can be set according to experience or according to a statistical value of the number of training epochs in historical training, for example, set based on the number of training epochs after the training.

Then, steps S4200 to S4400 will be executed, and the operations of these steps can be executed as the aforementioned steps S3300 to S3400, as seen in the previous description of steps S3300 to S3400, which will not be described in detail here.

S4500: update the dropout masks for all training samples according to the calculated fluctuation score and the defined weighted dropout mask function based on course learning In this step, the input are the fluctuation scores of all training samples calculated in the step S4400, and the fluctuation scores of all training samples are compared with the initialized fixed dropout threshold, if the fluctuation score of a training sample is less than the threshold, which means that the prediction and the ground-truth label of the training sample are stably consistent, the training sample is a clean sample, and its dropout mask can be calculated by the defined weighted dropout mask function based on course-learning; if the fluctuation score of the training sample is greater than or equal to the threshold, which means that the prediction and the ground-truth label of the training sample are unstable, the training sample is judged as a noisy sample, and its dropout mask is set to 0. The specific calculation formula of weighted dropout mask function based on course-learning can be as the aforementioned formula (10). As mentioned above, the obtained weighted dropout mask can be utilized as the weight for weighting the loss function.

Here, the weighting for training samples can be further optimized by considering the number of training epochs. Especially, the fewer the number of training epochs until the fluctuation score of a training sample is less than a specific threshold is, that is, the shorter the training epoch/time until the fluctuation becomes stable is, which means that the training sample is more likely to guide the network to carry out accurate training, so the weight for the training sample can be appropriately increased.

Then, steps S4600 to S4800 will be executed, and the operations of these steps can be executed as the aforementioned steps S3600 to S3800, as seen in the previous description of steps S3600 to S3800, which will not be described in detail here.

The fourth embodiment according to the present disclosure can drop noisy samples and low-quality samples dynamically, while the confidences of training samples in the current network database can be used to guide the training of neural network effectively, that is, the confidences of training samples are set based on the volatilities of training samples, particularly considering the number of training epochs, and the influences of training samples on model training are dynamically adjusted accordingly, which can accelerate the convergence of network model training. Furthermore, as mentioned above, preferably, the current training database used in each training epoch can be dynamically generated based on the initial training database, so that low-quality samples with recognition ability can be retained in the training database, and thus a network model with better generalization can be trained.

Figure 15:
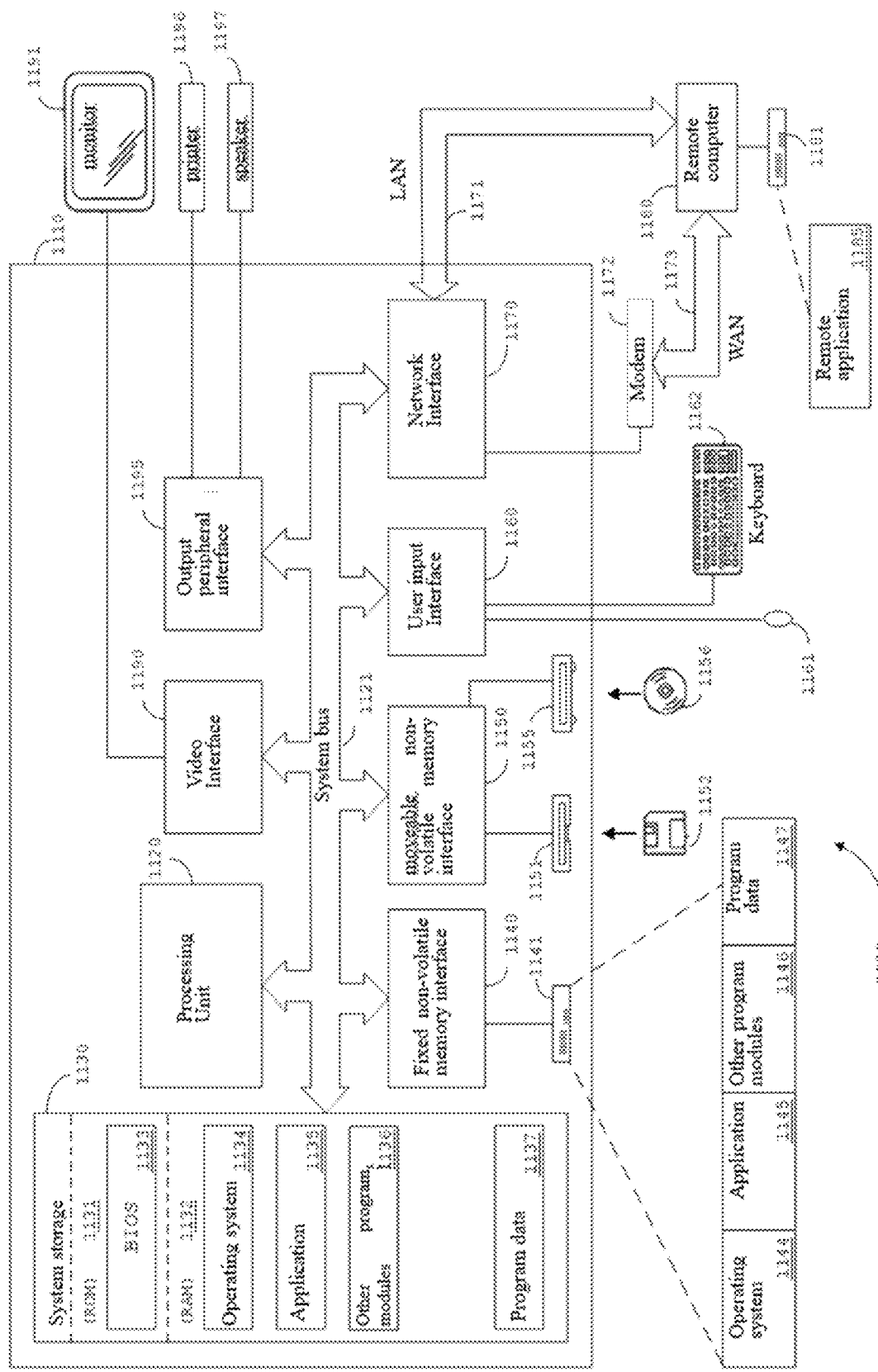
FIG. 15 shows a block diagram of an exemplary hardware configuration of a computer system capable of implementing the embodiments of the present disclosure.

FIG. 15 is a block diagram showing an exemplary hardware configuration of a computer system 1000 that can implement an embodiment of the present disclosure.

As shown in FIG. 15, the computer system comprises a computer 1110. The computer 1110 includes a processing unit 1120, a system storage 1130, a non-removable non-volatile memory interface 1140, a removable non-volatile memory interface 1150, a user input interface 1160, a network interface 1170, a vide interface 1190, and an output peripheral interface 1195, which are connected via a system bus 1121.

The system storage 1130 includes a ROM (readable only memory) 1131 and a RAM (random accessible memory) 1132. BIOS (basic input and output system) 1133 resides in ROM 1131. An operating system 1134, application program 1135, other program module 1136 and some program data 1137 reside in the RAM 1132.

A non-removable non-volatile memory 1141, such as a hard disk, is connected to the non-removable non-volatile memory interface 1140. The non-removable non-volatile memory 1141 may store, for example, an operating system 1144, an application program 1145, other program modules 1146, and some program data 1147.

Removable non-volatile memory (such as a floppy disk driver 1151 and a CD-ROM driver 1155) is connected to the removable non-volatile memory interface 1150. For example, a floppy disk 1152 may be inserted into the floppy disk driver 1151, and a CD (Compact Disc) 1156 may be inserted into the CD-ROM driver 1155.

Input devices such as a mouse 1161 and a keyboard 1162 are connected to the user input interface 1160.

The computer 1110 may be connected to a remote computer 1180 through a network interface 1170. For example, the network interface 1170 may be connected to a remote computer 1180 via a local area network 1171. Alternatively, the network interface 1170 may be connected to a modem (modulator-demodulator) 1172, and the modem 1172 is connected to a remote computer 1180 via a wide area network 1173.

The remote computer 1180 may include a storage 1181, such as a hard disk, that stores remote applications 1185.

The video interface 1190 is connected to a monitor 1191.

The output peripheral interface 1195 is connected to a printer 1196 and a speaker 1197.

The computer system shown in FIG. 15 is merely illustrative and is in no way intended to limit the disclosure, its application, or its usage.

The computer system shown in FIG. 15 may be implemented as an isolated computer or as a processing system in an apparatus for any embodiment, in which one or more unnecessary components may be removed or one or more additional components may be added.

The disclosure can be used in many applications. For example, the present disclosure can be used to monitor, identify, and track objects in still images or mobile videos captured by a camera, and is particularly advantageous for camera-equipped portable devices, (camera-based) mobile phones, and the like.

It should be noted that the methods and devices described herein may be implemented as software, firmware, hardware, or any combination thereof. Some components may be implemented, for example, as software running on a digital signal processor or microprocessor. Other components may be implemented, for example, as hardware and/or application specific integrated circuits.

In addition, the methods and systems of the present disclosure can be implemented in a variety of ways. For example, the methods and systems of the present disclosure may be implemented in software, hardware, firmware, or any combination thereof. The order of the steps of the method described above is merely illustrative, and unless specifically stated otherwise, the steps of the method of the present disclosure are not limited to the order specifically described above. In addition, in some embodiments, the present disclosure may also be embodied as a program recorded in a recording medium, including machine-readable instructions for implementing a method according to the present disclosure. Therefore, the present disclosure also encompasses a recording medium storing a program for implementing the method according to the present disclosure.

Those skilled in the art will appreciate that the boundaries between the operations described above are merely illustrative. Multiple operations can be combined into a single operation, a single operation can be distributed among additional operations, and operations can be performed with at least partially being overlapped in time. Moreover, alternative embodiments may include multiple instances of a particular operation, and the order of operations may be changed in other various embodiments. However, other modifications, changes, and substitutions are also possible. Accordingly, the description and drawings of the present disclosure are to be regarded as illustrative rather than restrictive.

In addition, the embodiments of the present disclosure may also include the following schematic examples (EE).

EE 1. A training sample optimization apparatus for a neural network model for object recognition, comprising: for each training sample in a training sample database,
- a fluctuation determination unit configured to determine a fluctuation of model prediction of the training sample relative to a corresponding labeled identity of the training sample in a case of training the neural network model;
- an optimization unit configured to determine whether the training sample can be used for training of the neural network model in the next training epoch, based on the fluctuation of the training sample.

EE 2. The apparatus of EE 1, wherein for a training sample in the training sample database which is available for training the neural network model in the current training epoch, the fluctuation of the training sample is determined based on a mathematical statistical value of difference between a model prediction similarity and a labeled identity similarity of the training sample.

EE 3. The apparatus of EE 1, wherein,
a model prediction similarity of the training sample indicates a minimum value of offsets between a prediction feature of the training sample and weight vectors representing all classes in a last full-connected layer of the neural network model, and/or
a labeled identity similarity of the training sample indicates the offset between the prediction feature of the training sample and the weight vector representing a ground-truth label class in the last full-connected layer of the neural network model.

EE 4. The apparatus of EE 1, wherein,
a model prediction similarity of the training sample is determined based on the minimum angle between a prediction feature of the training sample and the weight vectors representing all classes in the last full-connected layer of the neural network model, and/or
a labeled identity similarity of the training sample is determined based on the angle between the prediction feature of the training sample and the weight vector representing a ground-truth label class in the last full-connected layer of the neural network model.

EE 5. The apparatus of EE 1, wherein,
the fluctuation of the training sample corresponds to the mathematical statistical of accumulative values of the volatilities of the training sample in the current training and a certain number of previous training epochs.

EE 6. The apparatus of EE 1, wherein, for a training sample in the training sample database which is not available for training in the current training epoch, the fluctuation of the training sample corresponds to a mathematical statistical value of volatilities of a specific number of training samples in the training sample database that are available for training the neural network model.

EE 7. The apparatus of EE 1, wherein when the fluctuation of a training sample is less than a specific threshold, the training sample is available for training the neural network model in the next training epoch.

EE 8. The apparatus of EE 1, wherein,
the loss function of the training sample, when the neural network model is trained by using the training sample database, is weighted based on the fluctuation of training sample.

EE 9. The apparatus of EE 8, wherein,
the weighting weight is determined based on comparison result between the fluctuation and a specific threshold.

EE 10. The apparatus of EE 8 or 9, wherein,
the weighting weight is further determined based on the ratio of the fluctuation of the training sample to the maximum value of the volatilities of all the training samples.

EE 11. The apparatus of any one of EEs 8-10, wherein,
the weighting weight is further determined based on the number of training epochs until the current training.

EE 12. The apparatus of EE 7 or 9, wherein the specific threshold is a preset fixed threshold, and/or
the specific threshold is a dynamic threshold determined based on the fluctuation of the training sample.

EE 13. The apparatus of EE 12, wherein,
the dynamic threshold is determined based on mathematical statistical values of volatilities in previous trainings, and
the dynamic threshold is determined based on the proportion of training samples in the training sample database that are available for model training and the fluctuation of each training sample in the training sample database.

EE 14. The apparatus of EE 1, wherein the optimization unit is configured to optimize the training sample database when the trained neural network model does not meet a training end condition.

EE 15. The apparatus of EE 14, wherein the training end condition is at least one of:

the number of training epochs reach a predefined maximum number of training epochs; and
the calculated loss of the neural network model is lower than a predefined threshold.

EE 16. A training apparatus for a neural network model for object recognition, comprising:
a training sample optimization unit configured to, for a given training sample database, optimize a training sample database for neural network model training by using the training sample optimization apparatus of EE 1; and
a training unit configured to train the neural network model by utilizing the optimized training sample database.

EE 17. The apparatus of EE 16, further comprising:
an end determination unit configured to determine whether the trained neural network model meets the training end condition,
if it is determined that the trained neural network model does not meet the training end condition, optimization and training are further performed by the training sample optimization unit and the training unit with the optimized training sample database.

EE 18. The apparatus of EE 16, wherein the training end condition is at least one of:
the number of training epochs reach a predefined maximum number of training epochs; and
the calculated loss of the neural network model is lower than a predefined threshold.

EE 19. A training sample optimization method for a neural network model for object recognition, comprising: for each training sample in a training sample database,
a fluctuation determination step adapted to determine a fluctuation of model prediction of the training sample relative to a corresponding labeled identity of the training sample in a case of training the neural network model;
an optimization step adapted to determine whether the training sample can be used for training of the neural network model in the next training epoch, based on the fluctuation of the training sample.

EE 20. The method of EE 19, wherein the optimization step further comprises determining that when the fluctuation of a training sample is less than a specific threshold, the training sample is available for training the neural network model in the next training epoch.

EE 21. The method of EE 19, further comprising:
a step adapted to weight the loss function of the training sample, when the neural network model is trained by using the training sample database, based on the fluctuation of training sample.

EE 22. The method of EE 19, wherein the optimization step further comprises optimizing the training sample database when the trained neural network model does not meet a training end condition.

EE 23. A training method for a neural network model for object recognition, comprising:
a training sample optimization step adapted to, for a given training sample database, optimize a training sample database for neural network model training by using the training sample optimization method of EE 19; and
a training step adapted to train the neural network model by utilizing the optimized training sample database.

EE 24. The method of EE 23, further comprising:
an end determination step adapted to determine whether the trained neural network model meets the training end condition.

If it is determined that the trained neural network model does not meet the training end condition, optimization and training are further performed by the training sample optimization step and the training step with the optimized training sample database.

EE 25. A device, comprising
at least one processor; and
at least one storage device on which instructions are stored, the instructions, when executed by the at least one processor, causing the at least one processor to perform the method of any of EEs 19 to 24.

EE 26. A storage medium storing instructions that, when executed by a processor, cause execution of the method of any of EEs 19 to 24.

Although the disclosure has been described with reference to example embodiments, it should be understood that the disclosure is not limited to the disclosed example embodiments. The scope of the following claims is to be accorded the broadest interpretation so as to encompass all such modifications and equivalent structures and functions.

Although some specific embodiments of the present disclosure have been described in detail through examples, those skilled in the art should understand that the above examples are only for the purpose of illustration and are not intended to limit the scope of the present disclosure. The embodiments disclosed herein may be arbitrarily combined without departing from the spirit and scope of the present disclosure. Those skilled in the art should also understand that various modifications can be made to the embodiments without departing from the scope and spirit of the present disclosure.

What is claimed is:

1. A training sample optimization apparatus for a neural network model for object recognition, comprising:
at least one processor; and
at least one storage device on which instructions are stored, the instructions, when executed by the at least one processor, causing the at least one processor to:
for each training sample in a plurality of training samples,
obtain a model prediction of the training sample and a corresponding labeled identity of the training sample, wherein the model prediction of the training sample was generated by a neural network model;
determine a fluctuation of the model prediction of the training sample relative to the corresponding labeled identity of the training sample based on at least one difference between the model prediction of the training sample and the corresponding labeled identity of the training sample; and
determine whether the training sample can be used for training of the neural network model in a next training epoch, based on the fluctuation of the training sample.

2. The apparatus of claim 1, wherein, for each training sample in a plurality of training samples, the fluctuation of the model prediction of the training sample is determined based on a mathematical statistical value of the at least one difference between a model prediction similarity of the model prediction and a labeled identity similarity of the corresponding labeled identity of the training sample.

3. The apparatus of claim 2, wherein,
the model prediction similarity of the model prediction of the training sample indicates a minimum value of offsets between a prediction feature of the training sample and weight vectors representing all classes in a last full-connected layer of the neural network model, or the labeled identity similarity of the corresponding labeled identity of the training sample indicates the offset between the prediction feature of the training sample and the weight vector representing a ground-truth label class in the last full-connected layer of the neural network model.

4. The apparatus of claim 2, wherein,
the model prediction similarity of the model prediction of the training sample is determined based on a minimum angle between a prediction feature of the training sample and weight vectors representing all classes in a last full-connected layer of the neural network model, or
the labeled identity similarity of the corresponding labeled identity of the training sample is determined based on the angle between the prediction feature of the training sample and the weight vector representing a ground-truth label class in the last full-connected layer of the neural network model.

5. The apparatus of claim 1,
wherein the at least one difference between the model prediction of the training sample and the corresponding labeled identity of the training sample includes differences between the model prediction of the training sample and the corresponding labeled identity of the training sample from a current training epoch and from a certain number of previous training epochs, and
wherein the fluctuation of the training sample corresponds to a mathematical statistical value of accumulative values of the differences between the model prediction of the training sample and the corresponding labeled identity of the training sample from the current training epoch and from the certain number of previous training epochs.

6. The apparatus of claim 1, wherein, for each training sample of the plurality of training samples, when the fluctuation of the training sample is less than a specific threshold, the training sample is determined to be available for training of the neural network model in the next training epoch.

7. The apparatus of claim 6, wherein, for each training sample of the plurality of training samples, when the fluctuation of the training sample is greater than the specific threshold, the training sample is determined to not be available for training of the neural network model in the next training epoch.

8. The apparatus of claim 6, wherein the specific threshold is either a preset fixed threshold, or
for each training sample of the plurality of training samples, the specific threshold is a dynamic threshold determined based on the fluctuation of the training sample.

9. The apparatus of claim 8, wherein,
the dynamic threshold is determined based on a mathematical statistical value of volatilities in previous trainings, or
the dynamic threshold is determined based on a proportion of training samples in the plurality of training samples that are available for training of the neural network model and the fluctuation of each training sample of the plurality of training samples.

10. The apparatus of claim 1, wherein, for each training sample in the plurality of training samples,
a loss function for the training sample, when the neural network model is trained by using the plurality of training samples, is weighted based on the fluctuation of the training sample.

11. The apparatus of claim 10, wherein,
a weighting weight is determined based on comparison result between the fluctuation and a specific threshold.

12. The apparatus of claim 10, wherein,
a weighting weight is determined based on a ratio of the fluctuation of the training sample to a maximum value of volatilities of all of the plurality of training samples.

13. The apparatus of claim 10, wherein,
a weighting weight is determined based on a number of training epochs until a current training epoch.

14. The apparatus of claim 1, wherein the instructions, when executed by the at least one processor, further cause the at least one processor to optimize the plurality of training samples when the neural network model does not satisfy a training end condition.

15. The apparatus of claim 14, wherein the training end condition is at least one of:
a number of training epochs reach a predefined maximum number of training epochs; and
a calculated loss of the neural network model is lower than a predefined threshold.

16. A training apparatus for a neural network model for object recognition, comprising:
at least one processor; and
at least one storage device on which instructions are stored, the instructions, when executed by the at least one processor, causing the at least one processor to:
perform a training sample optimization, wherein the training sample optimization includes, for each training sample in a plurality of training samples,
obtaining a model prediction of the training sample and a corresponding labeled identity of the training sample, wherein the model prediction of the training sample was generated by a neural network model,
determining a fluctuation of the model prediction of the training sample relative to the corresponding labeled identity of the training sample based on at least one difference between the model prediction of the training sample and the corresponding labeled identity of the training sample, and
determining whether the training sample can be used for training of the neural network model in a next training epoch, based on the fluctuation of the training sample; and
performing the next training epoch to train the neural network model by utilizing the training samples that, as determined, can be used for training of the neural network model.

17. The apparatus of claim 16, wherein the instructions, when executed by the at least one processor, further cause the at least one processor to:
determine whether the neural network model satisfies a training end condition after completion of the next training epoch; and
if it is determined that the neural network model does not satisfy the training end condition after completion of the next training epoch, perform the training sample optimization again and perform another training epoch.

18. The apparatus of claim 17, wherein the training end condition is at least one of:
a number of completed training epochs reach a predefined maximum number of training epochs; and
a calculated loss of the neural network model is lower than a predefined threshold.

19. A training sample optimization method for a neural network model for object recognition, comprising:
for each training sample in a plurality of training samples, obtaining a model prediction of the training sample and a corresponding labeled identity of the training sample, wherein the model prediction of the training sample was generated by a neural network model;
determining a fluctuation of the model prediction of the training sample relative to the corresponding labeled identity of the training sample based on at least one difference between the model prediction of the training sample and the corresponding labeled identity of the training sample; and
determining whether the training sample can be used for training of the neural network model in a next training epoch, based on the fluctuation of the training sample.

20. The method of claim 19, further comprising:
for each training sample in the plurality of training samples, weighting a loss function of the training sample, when the neural network model is trained by using the plurality of training samples, based on the fluctuation of training sample.

* * * * *